United States Patent
Yasui

(10) Patent No.: US 10,659,669 B2
(45) Date of Patent: May 19, 2020

(54) PROJECTION DISPLAY UNIT

(71) Applicant: SONY CORPORATION, Tokyo (JP)

(72) Inventor: Toshifumi Yasui, Kanagawa (JP)

(73) Assignee: SONY CORPORATION, Tokyo (JP)

(*) Notice: Subject to any disclaimer, the term of this patent is extended or adjusted under 35 U.S.C. 154(b) by 4 days.

(21) Appl. No.: 16/092,596

(22) PCT Filed: Feb. 1, 2017

(86) PCT No.: PCT/JP2017/003583
§ 371 (c)(1),
(2) Date: Oct. 10, 2018

(87) PCT Pub. No.: WO2017/183249
PCT Pub. Date: Oct. 26, 2017

(65) Prior Publication Data
US 2019/0132499 A1 May 2, 2019

(30) Foreign Application Priority Data

Apr. 18, 2016 (JP) ................. 2016-082628

(51) Int. Cl.
H04N 5/225 (2006.01)
G03B 21/20 (2006.01)
(Continued)

(52) U.S. Cl.
CPC ......... *H04N 5/2257* (2013.01); *G02B 27/283* (2013.01); *G03B 21/00* (2013.01); *G03B 21/14* (2013.01); *G03B 21/2013* (2013.01); *G03B 21/2033* (2013.01); *G06F 3/0346* (2013.01); *H04N 5/2251* (2013.01); *H04N 5/238* (2013.01); *H04N 5/74* (2013.01); *H04N 9/3141* (2013.01); *H04N 9/3155* (2013.01); *H04N 9/3176* (2013.01); *H04N 9/3197* (2013.01)

(58) Field of Classification Search
None
See application file for complete search history.

(56) References Cited

U.S. PATENT DOCUMENTS

2003/0122780 A1   7/2003   Hendriks et al.
2011/0181841 A1*  7/2011   Sawahata ............... G03B 21/53
                                                          353/31
(Continued)

FOREIGN PATENT DOCUMENTS

CN      104321680 A      1/2015
DE    102012205164 A1   10/2013
(Continued)

OTHER PUBLICATIONS

International Search Report and Written Opinion of PCT Application No. PCT/JP2017/003583, dated Apr. 18, 2017, 8 pages of ISRWO.

Primary Examiner — Quan Pham
(74) Attorney, Agent, or Firm — Chip Law Group

(57) ABSTRACT

The projection display unit includes an illumination section including one or a plurality of light sources, a light valve that modulates light emitted from the illumination section and outputs the modulated light, a projection lens section that projects the light outputted from the light valve onto a projection surface, a light-receiving section including an imaging device that receives light incident via the projection lens section, and an optical device that allows for splitting into respective optical paths that pass through the illumination section, the light valve, and the light-receiving section. A first range corresponding to a portion of a pupil range of the projection lens section is assigned for projection, and the light-receiving section includes a light-shielding part that performs light-shielding of a selective part corresponding to the first range, at a position substantially optically conjugate with respect to an aperture of the projection lens section.

20 Claims, 23 Drawing Sheets

(51) Int. Cl.
*G02B 27/28* (2006.01)
*H04N 5/238* (2006.01)
*H04N 9/31* (2006.01)
*H04N 5/74* (2006.01)
*G03B 21/14* (2006.01)
*G03B 21/00* (2006.01)
*G06F 3/0346* (2013.01)

(56) References Cited

U.S. PATENT DOCUMENTS

2011/0241986 A1* 10/2011 Feng .................. G03B 21/14
 345/158
2015/0085259 A1 3/2015 Schreiber et al.

FOREIGN PATENT DOCUMENTS

| EP | 2831660 A1 | 2/2015 |
| JP | 2011-186704 A | 9/2001 |
| JP | 2003-044839 A | 2/2003 |
| JP | 2007-052218 A | 3/2007 |
| JP | 2009-171442 A | 7/2009 |
| JP | 2011-186704 A | 9/2011 |
| JP | 2015-064550 A | 4/2015 |
| JP | 2015-518575 A | 7/2015 |
| KR | 10-2014-0141683 A | 12/2014 |
| WO | 2013/144311 A1 | 10/2013 |
| WO | 2016/031447 A1 | 3/2016 |

* cited by examiner

[FIG. 1]
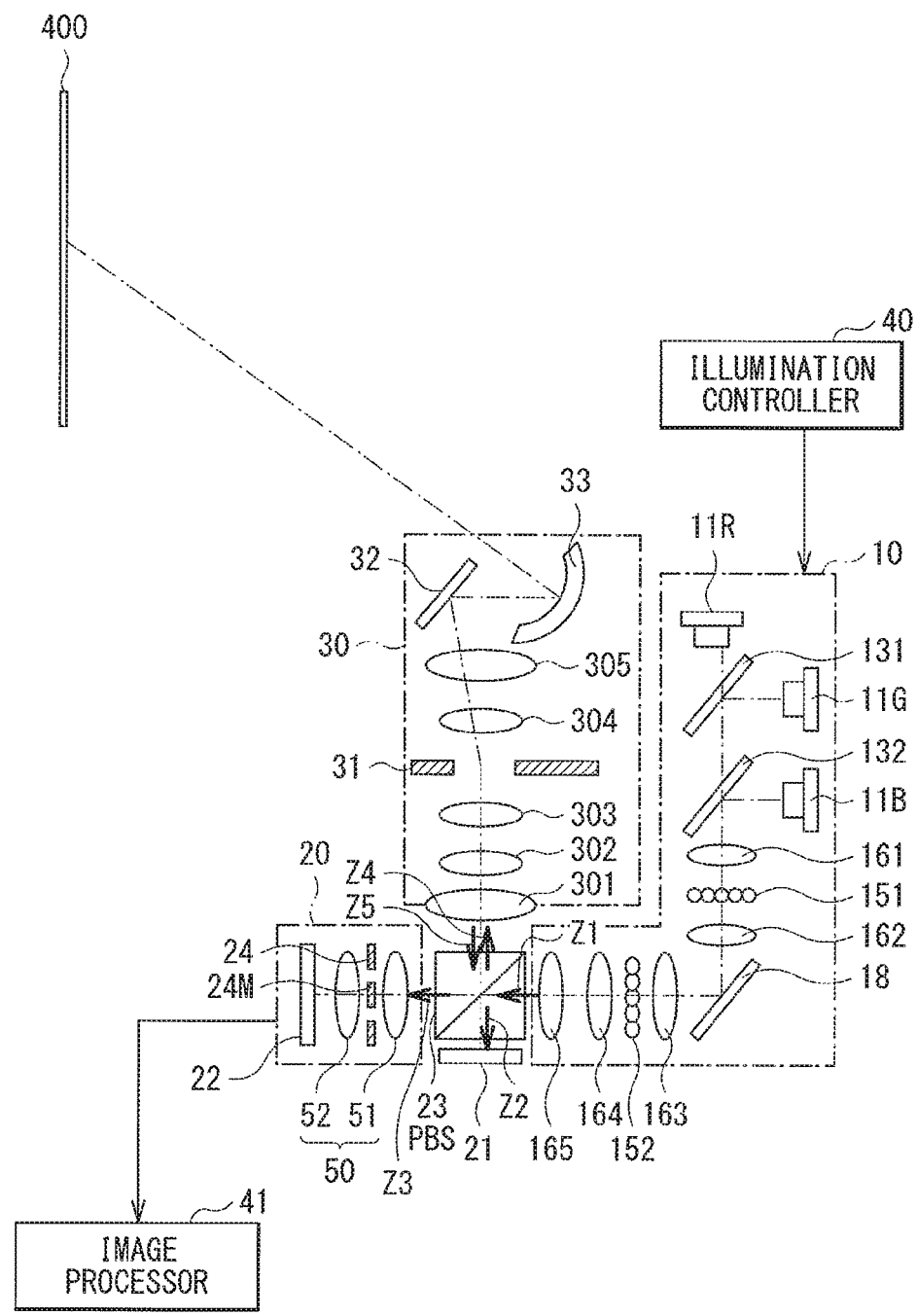

[ FIG. 2 ]
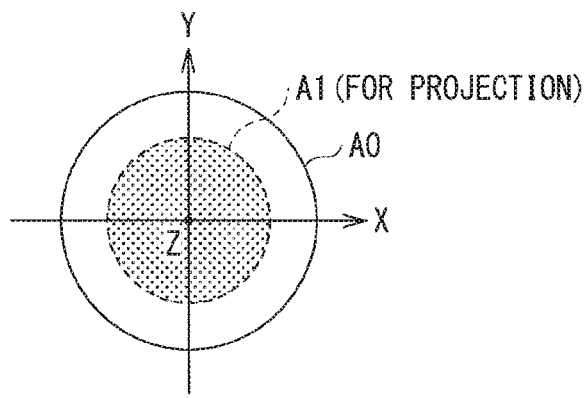
[ FIG. 3A ]
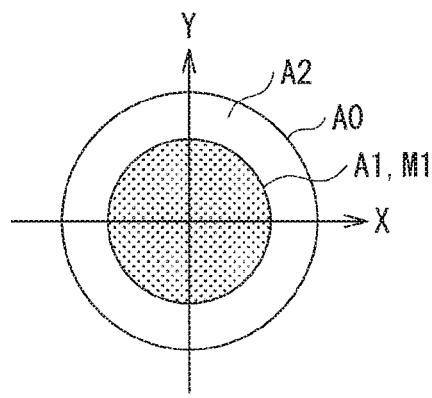
[ FIG. 3B ]
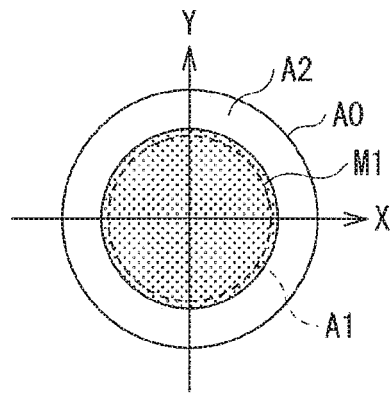

[ FIG. 4 ]
| F-NUMBER OF OPENING (F/d2) | F-NUMBER OF OPENING (F/d1) | MTF (%) |
|---|---|---|
| 4 | — | 81.6 |
| 3 | — | 75.6 |
| 3 | 4 | 30.0 |
| 2.5 | 4 | 58.3 |
| 2 | 4 | 74.9 |
| 3 | 3.5 | 16.3 |
| 2.5 | 3.5 | 45.0 |
| 2 | 3.5 | 70.8 |
| 2.5 | 3 | 23.4 |
| 2 | 3 | 62.0 |
| 1.7 | 3 | 75.0 |
[ FIG. 5 ]
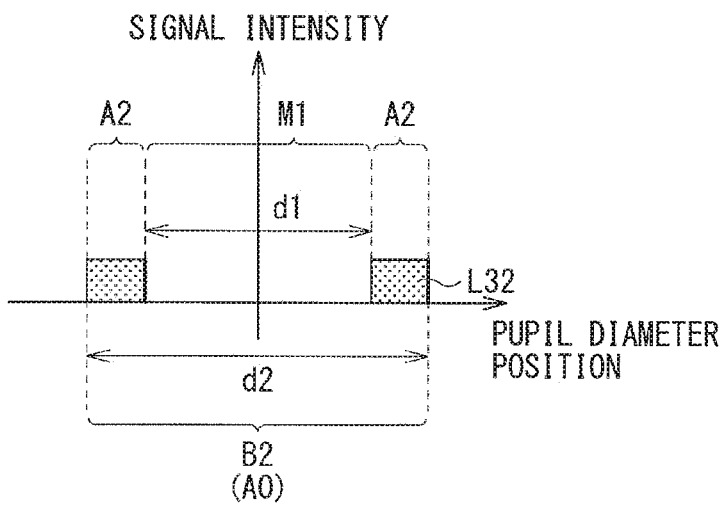

[ FIG. 6A ]
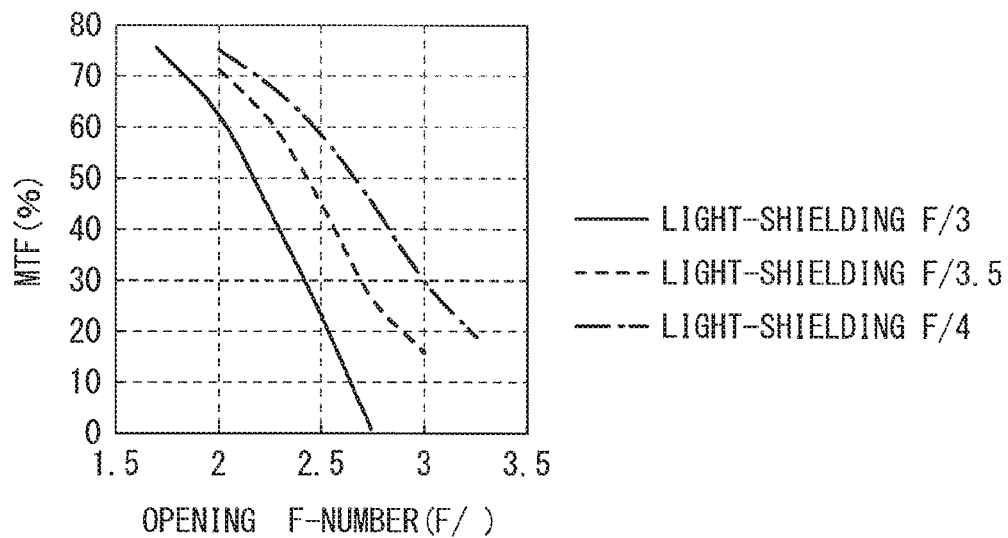
[ FIG. 6B ]
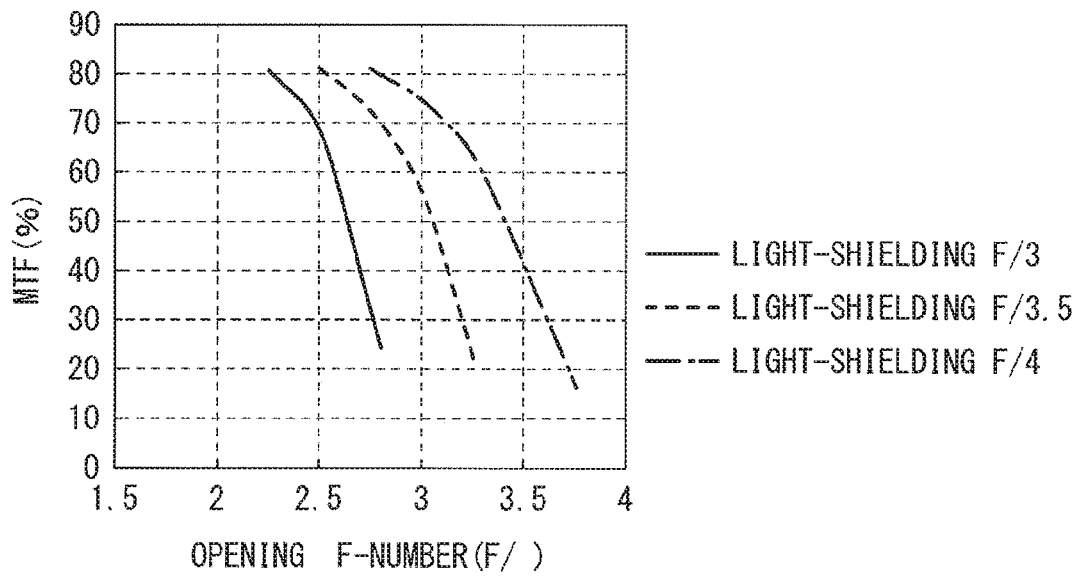

[ FIG. 7A ]
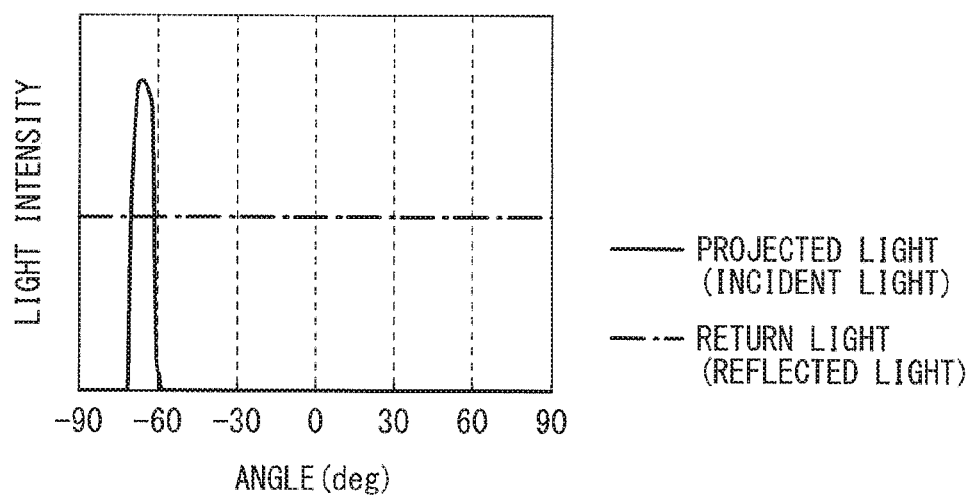
[ FIG. 7B ]
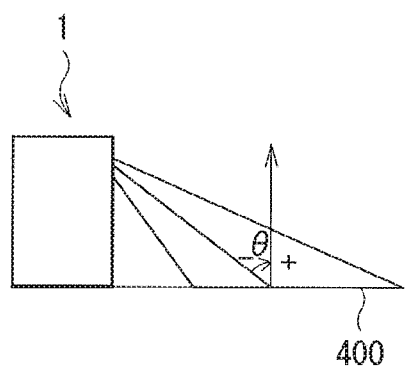

[ FIG. 8 ]
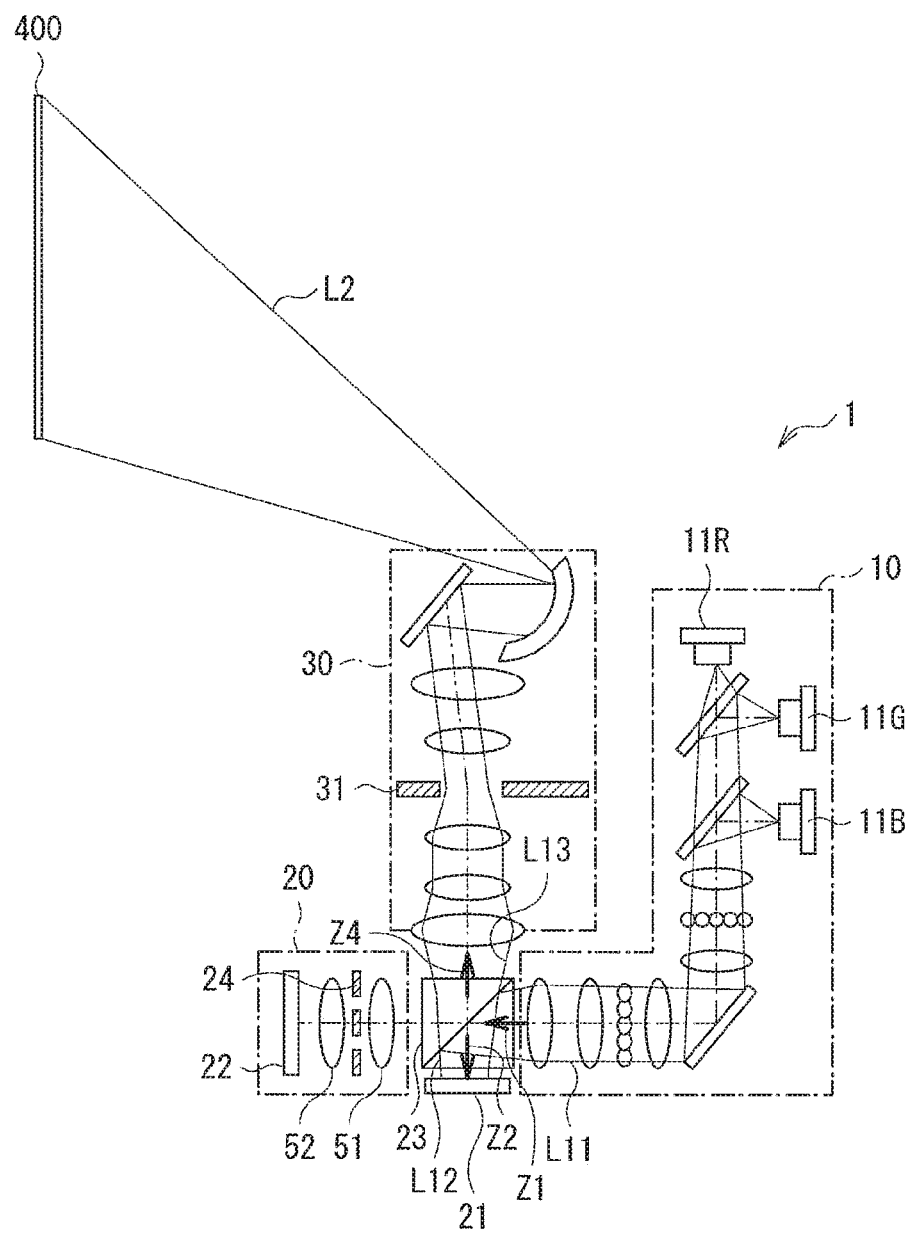

[FIG. 9]
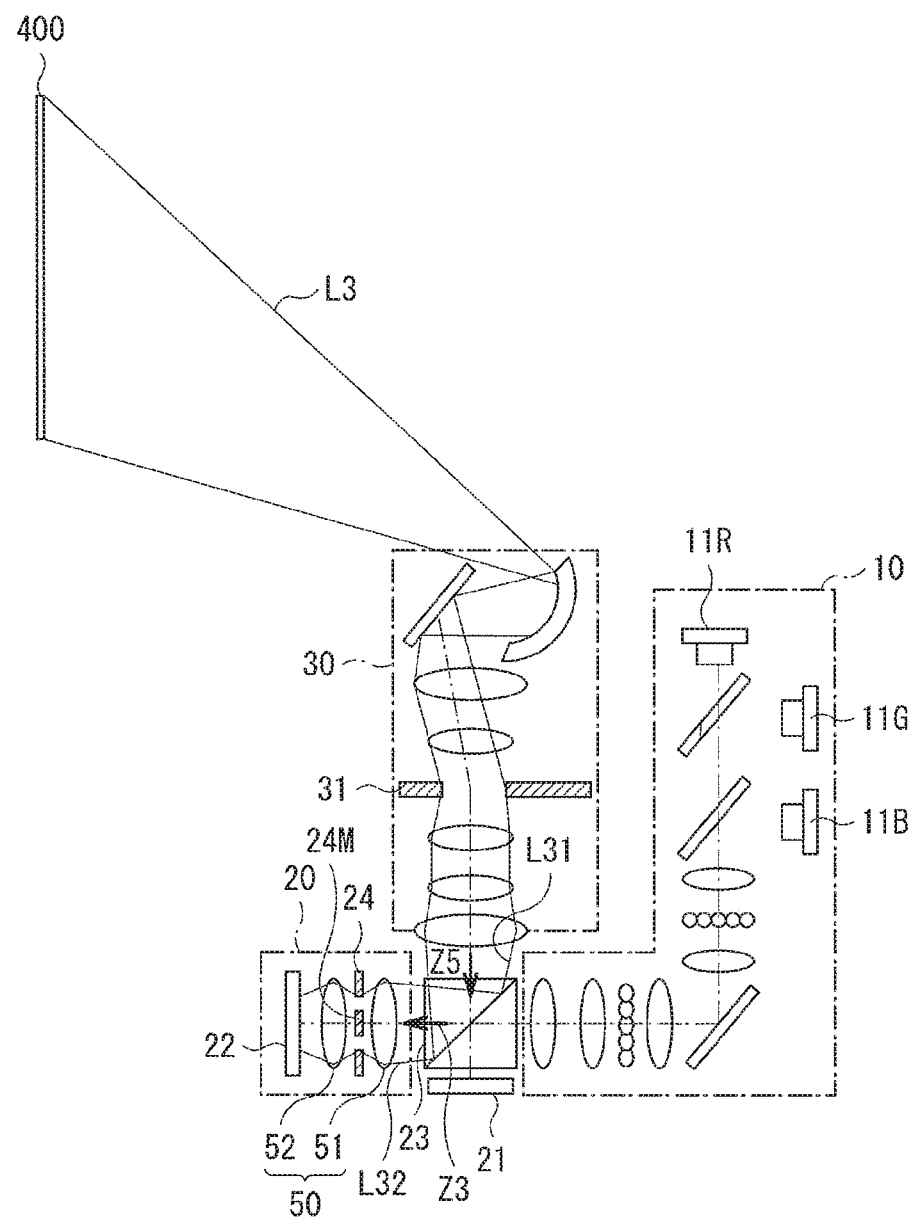

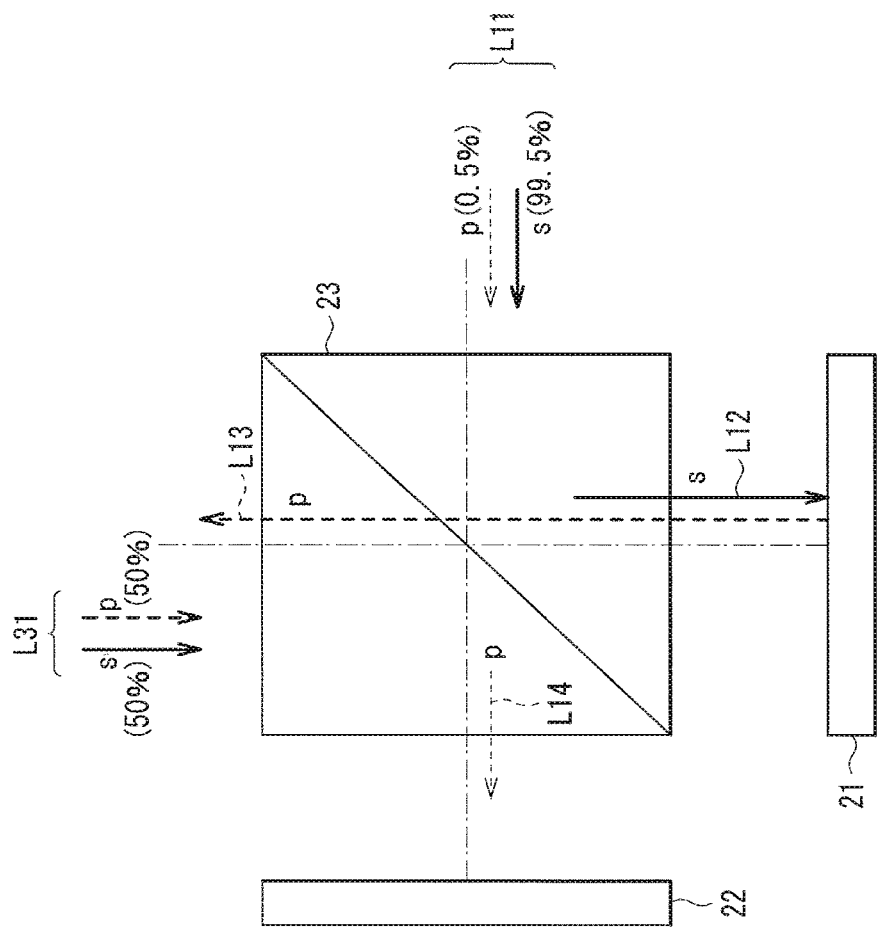
[ FIG. 10 ]

[ FIG. 11 ]
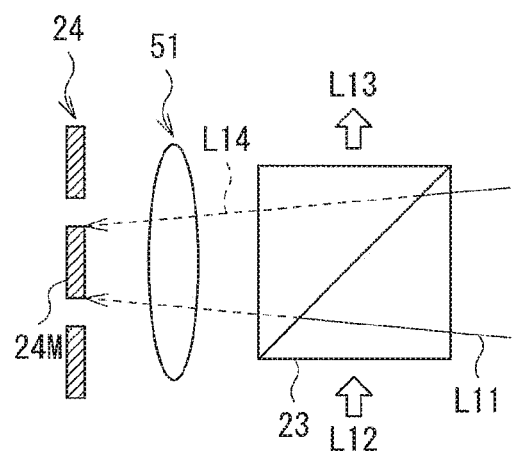

[ FIG. 12A ]
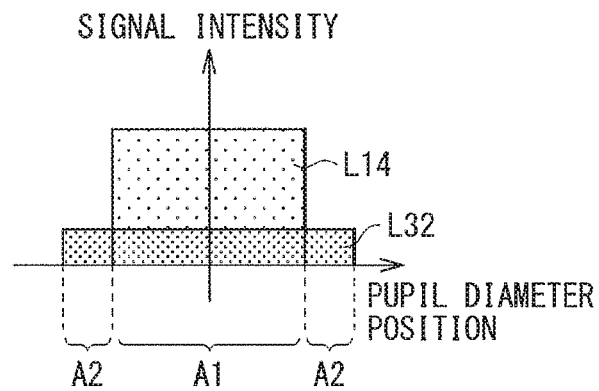
[ FIG. 12B ]
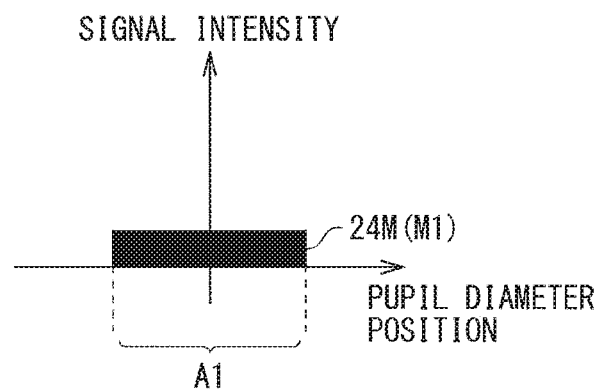
[ FIG. 12C ]
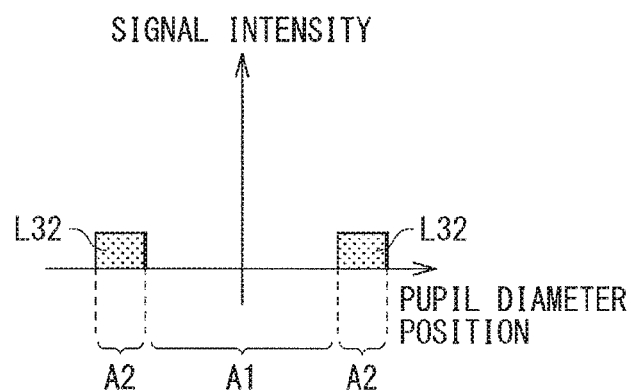

[FIG. 13]
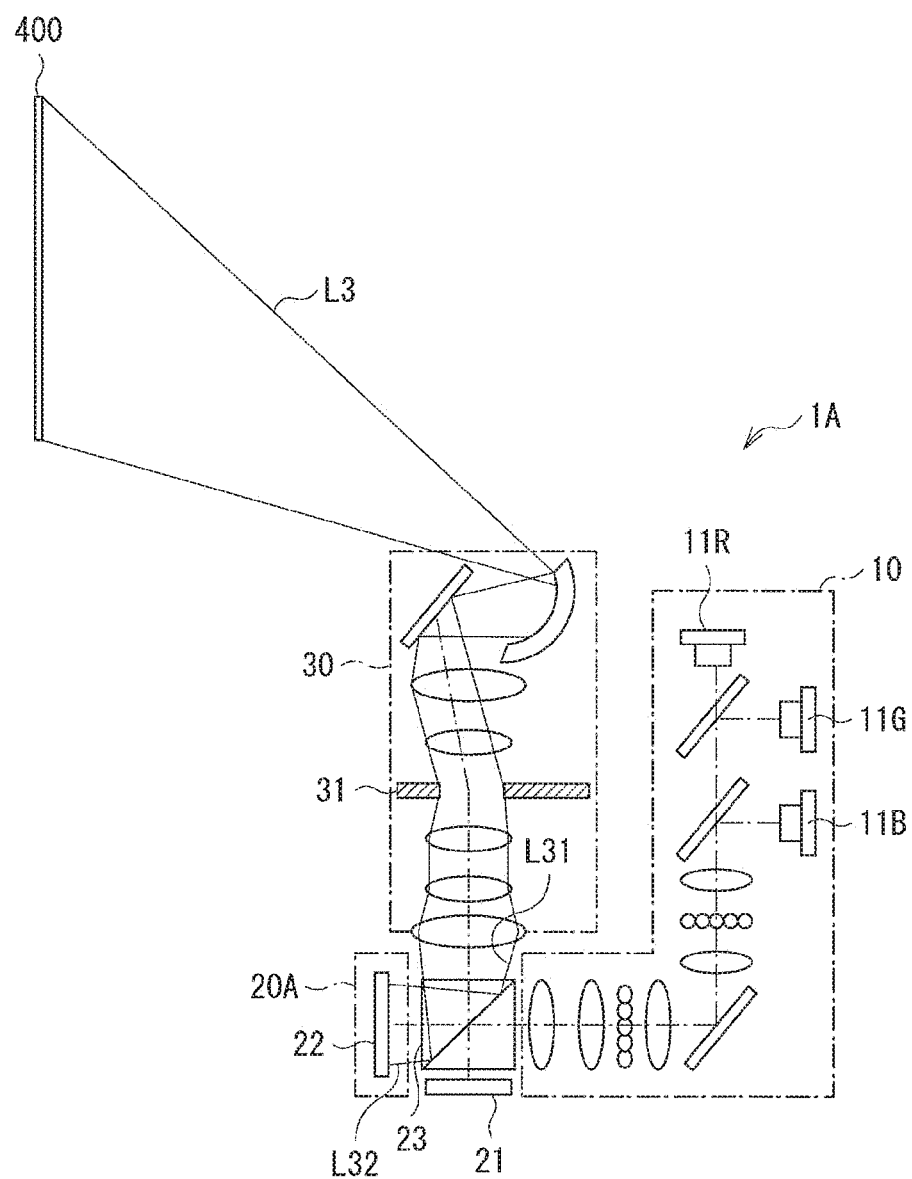

[ FIG. 14 ]
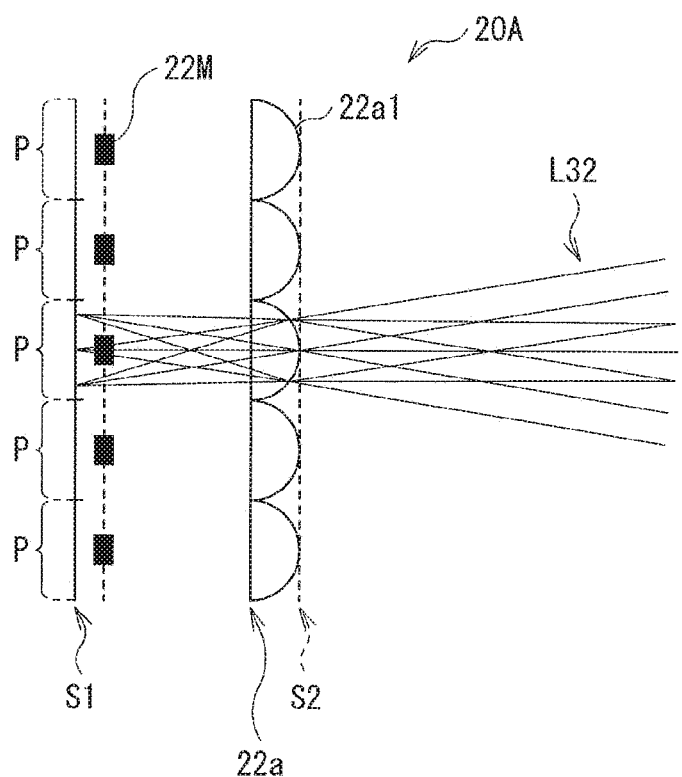
[ FIG. 15 ]
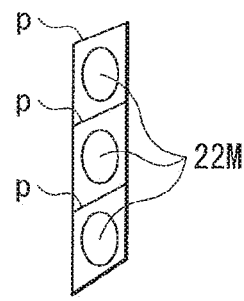

[ FIG. 16 ]
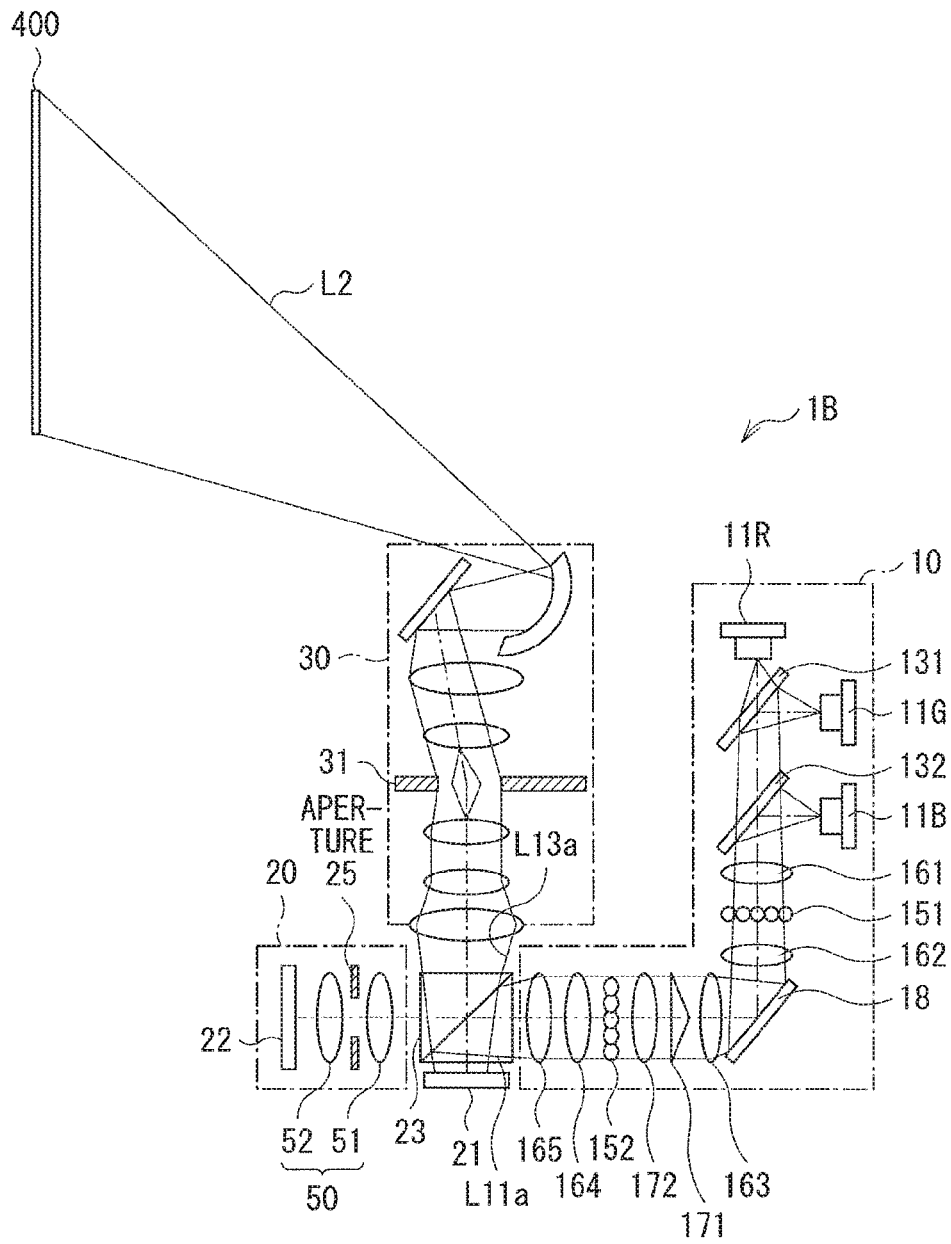

[ FIG. 17 ]
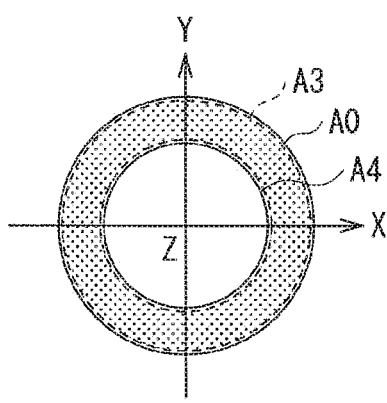
[ FIG. 18 ]
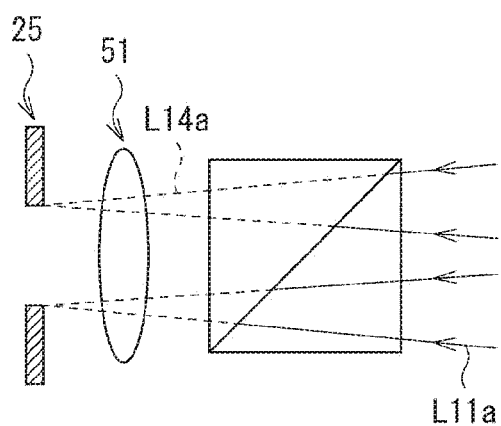

[ FIG. 19 ]
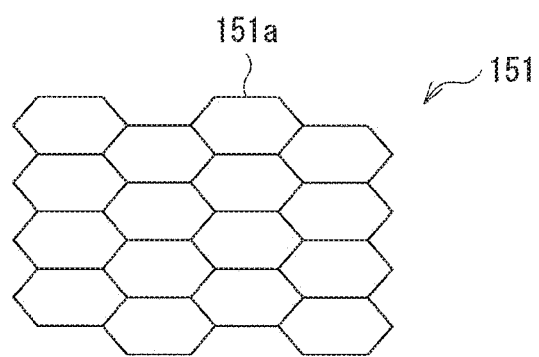
[ FIG. 20 ]
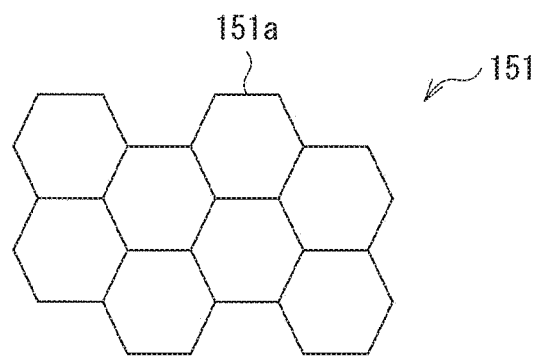

[ FIG. 21 ]
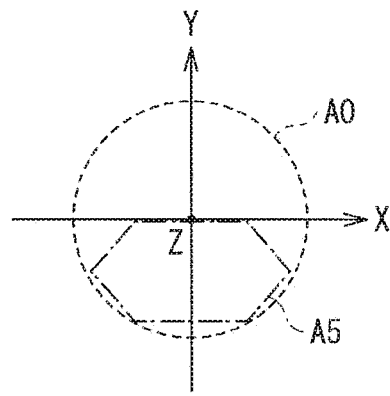
[ FIG. 22 ]
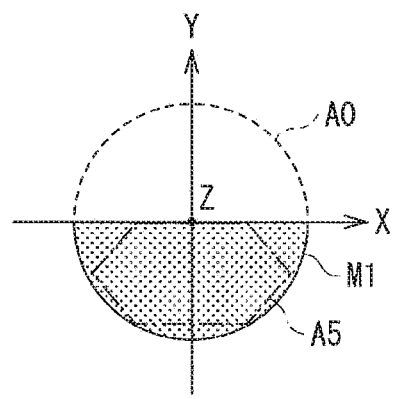
[ FIG. 23 ]
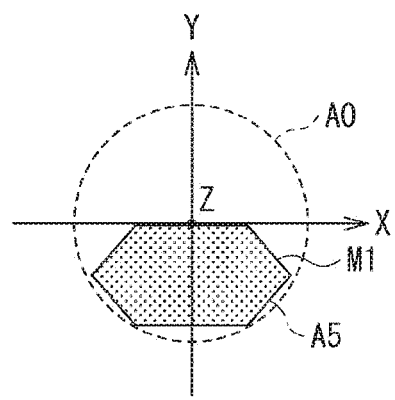

[ FIG. 24 ]
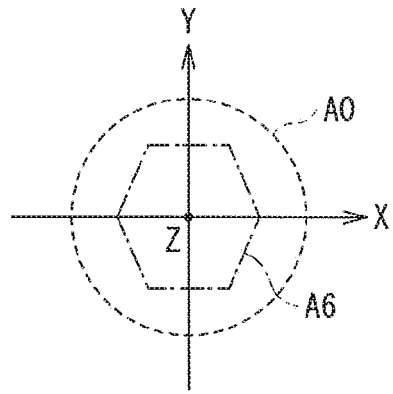
[ FIG. 25A ]
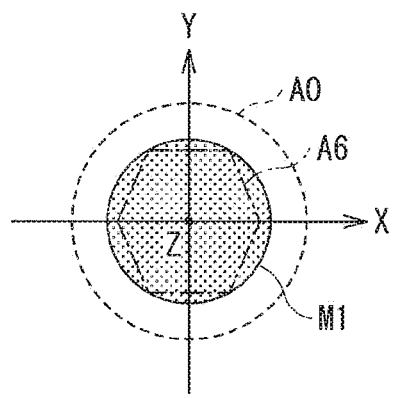
[ FIG. 25B ]
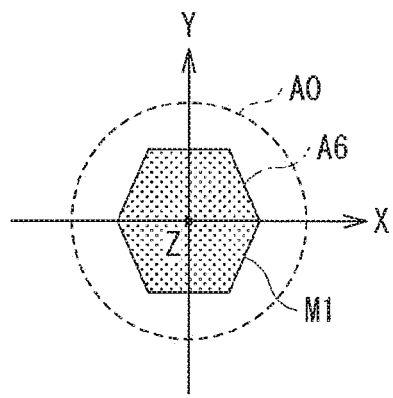

[ FIG. 26 ]
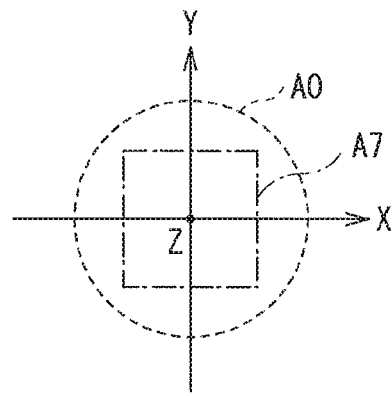
[ FIG. 27A ]
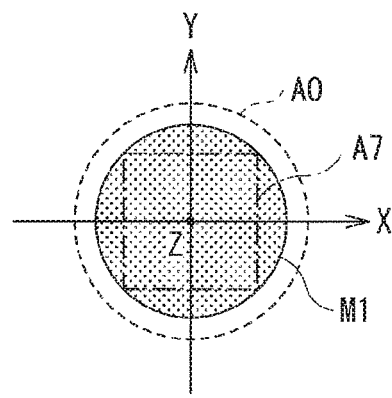
[ FIG. 27B ]
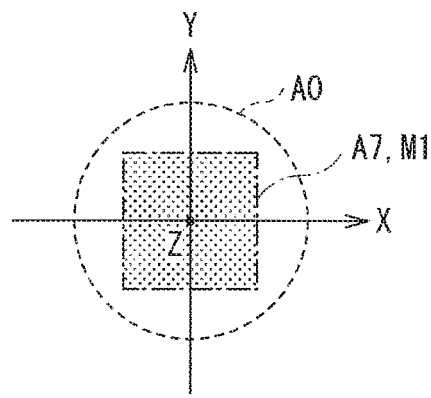

[ FIG. 28 ]
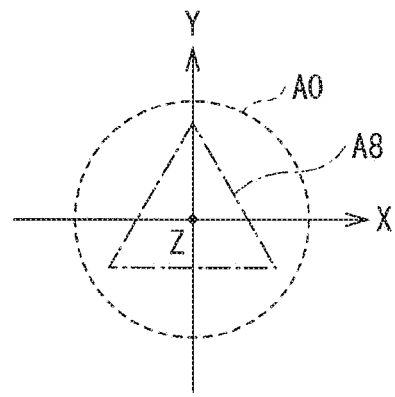
[ FIG. 29A ]
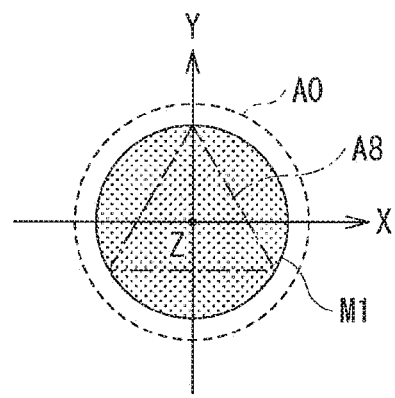
[ FIG. 29B ]
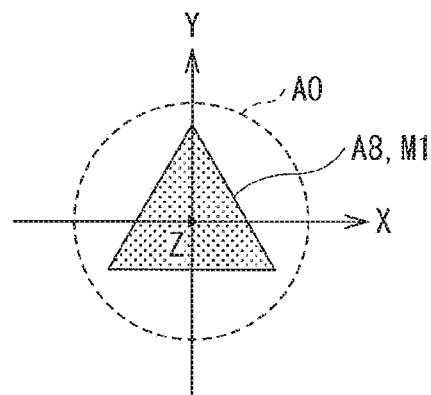

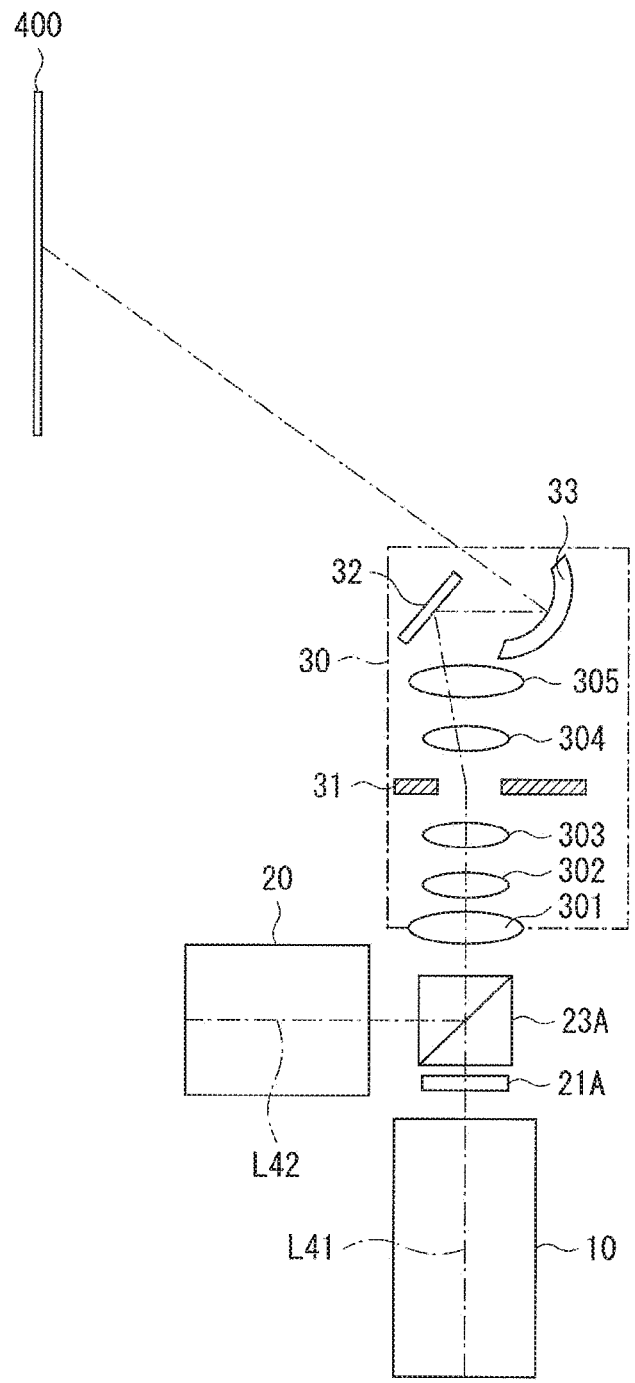
[ FIG. 30 ]

[ FIG. 31 ]
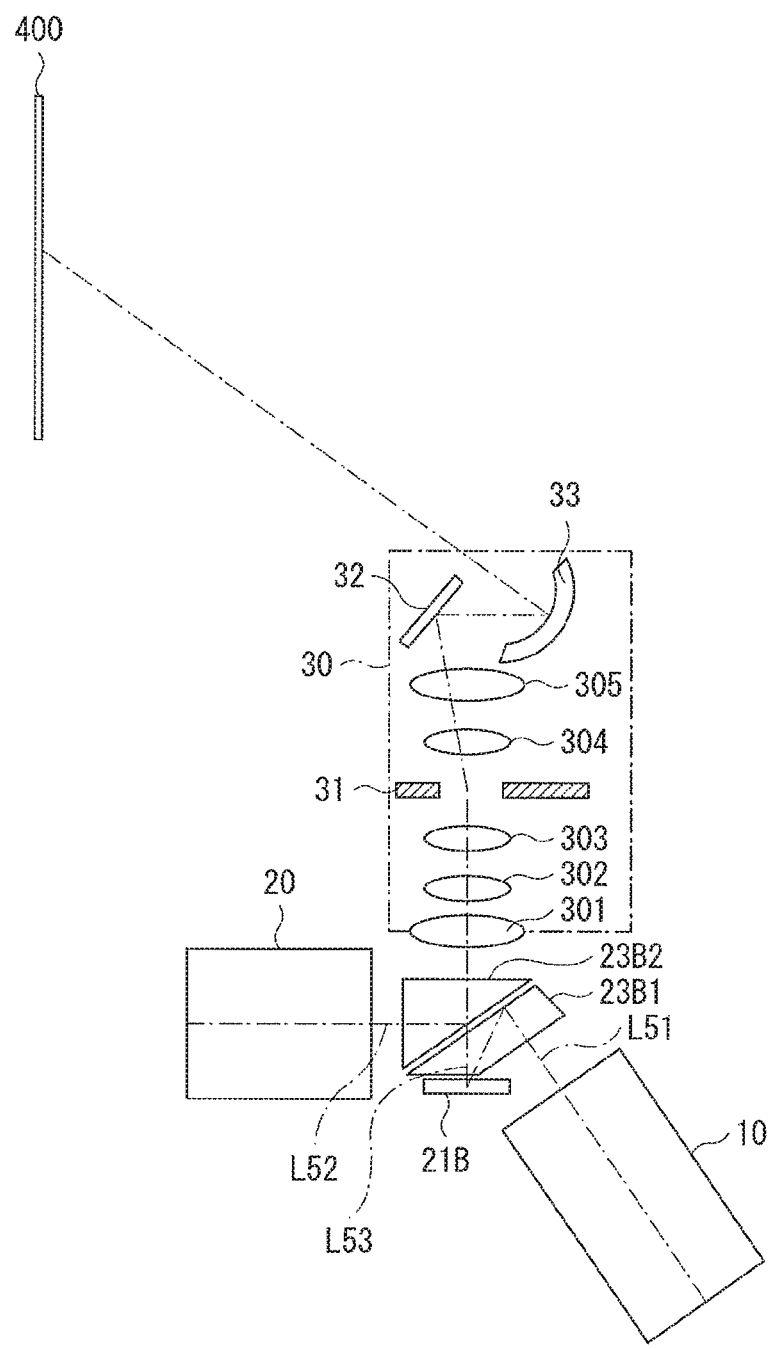

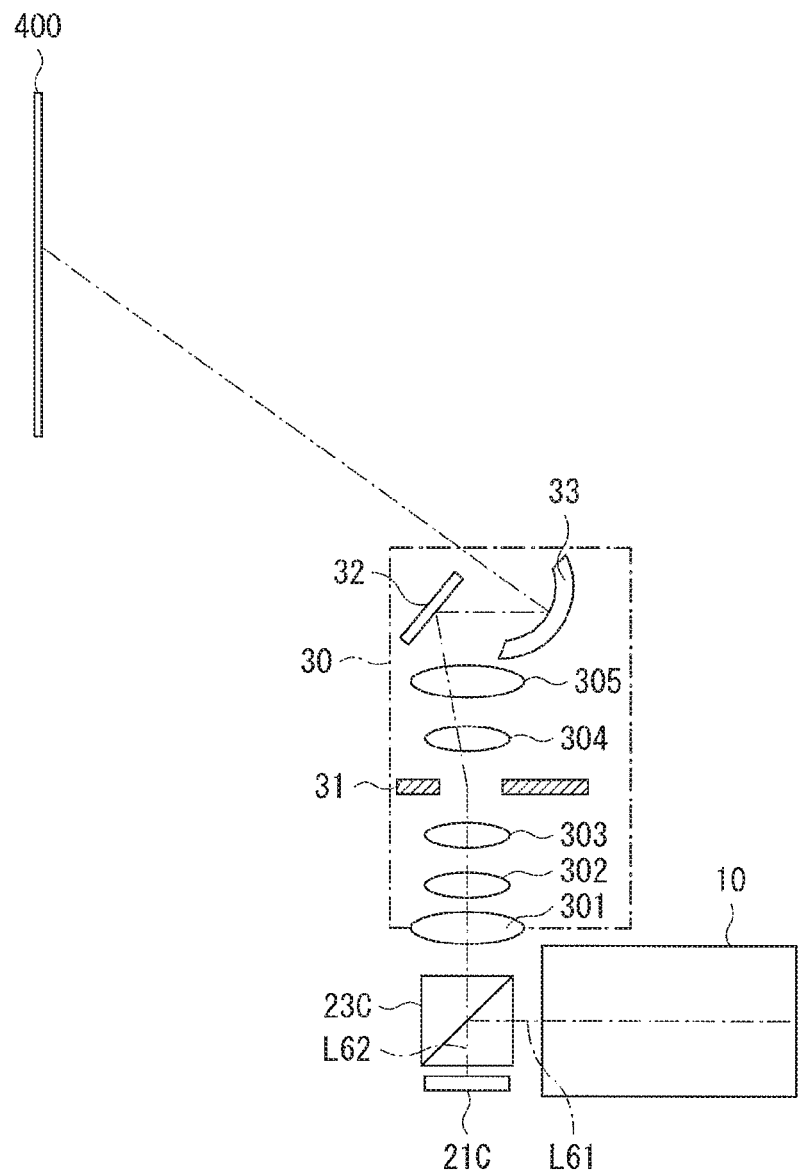
[ FIG. 32 ]

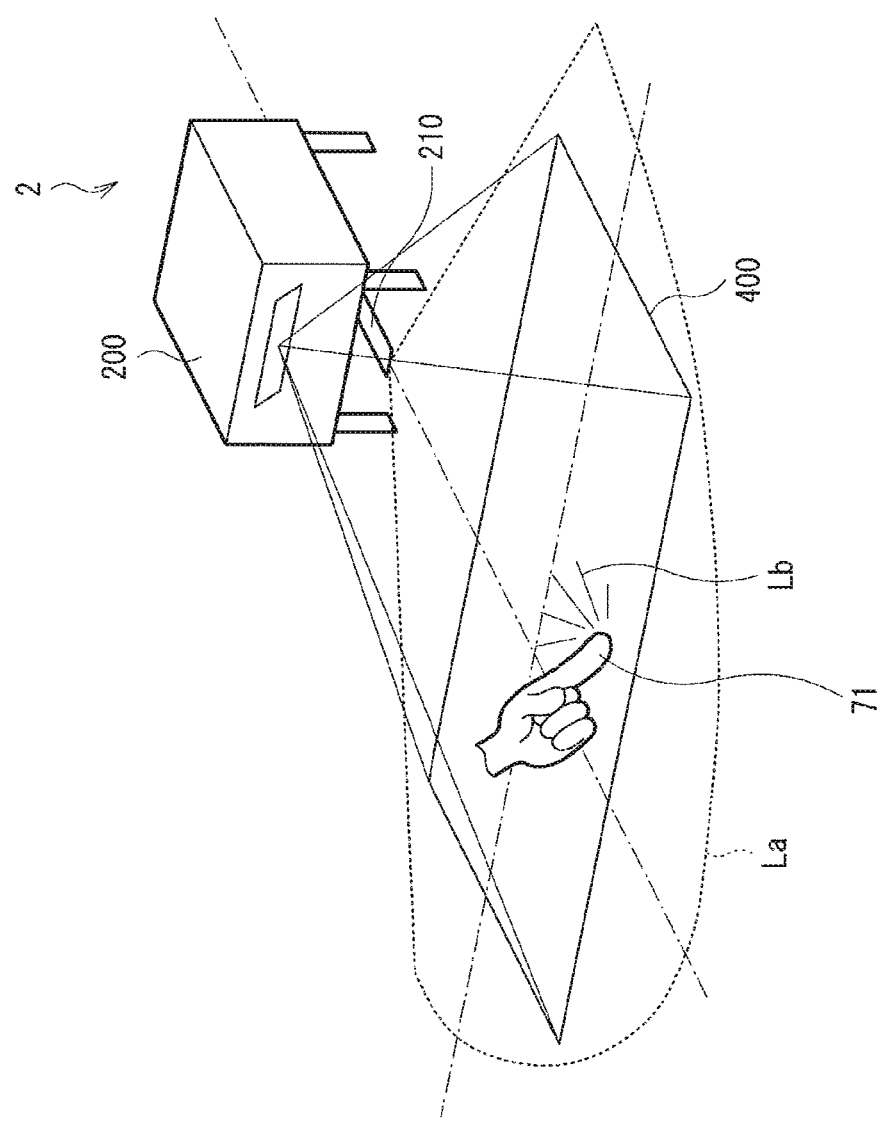
[ FIG. 33 ]

PROJECTION DISPLAY UNIT

CROSS REFERENCE TO RELATED APPLICATIONS

This application is a U.S. National Phase of International Patent Application No.: PCT/JP2017/003583 filed on Feb. 1, 2017, which claims priority benefit of Japanese Patent Application No. JP 2016-082628 filed in the Japan Patent Office on Apr. 18, 2016. Each of the above-referenced applications is hereby incorporated herein by reference in its entirety.

TECHNICAL FIELD

The present disclosure relates to a projection display unit having an imaging function.

BACKGROUND ART

In recent years, there has been proposed a projection display unit that incorporates a light-receiving section in a projector module, and is able to read information in a projection surface (e.g., PTLs 1 and 2).

CITATION LIST

Patent Literature

PTL 1: Japanese Unexamined Patent Application Publication No. 2003-44839
PTL 2: Japanese Unexamined Patent Application Publication No. 2015-64550
PTL 3: Japanese Unexamined Patent Application Publication No. 2007-52218

SUMMARY OF THE INVENTION

In this projection display unit, separation of polarization component emitted from an illumination section (illumination optical system) and polarization component to be detected in a light-receiving section (light-receiving optical system) from each other makes it possible to share a projection lens upon projection and upon imaging.

In the above-described projection display unit, however, a portion of light emitted from the illumination section leaks into light-receiving side, and thus lowers an S/N ratio in some cases. This leads to degradation in image quality of a captured image.

It is desirable to achieve a projection display unit that makes it possible to suppress degradation in image quality of a captured image.

The projection display unit according to an embodiment of the present disclosure includes an illumination section including one or a plurality of light sources, a light valve that modulates light emitted from the illumination section and outputs the modulated light, a projection lens section that projects the light outputted from the light valve onto a projection surface, a light-receiving section including an imaging device that receives light incident via the projection lens section, and an optical device that allows for splitting into respective optical paths that pass through the illumination section, the light valve, and the light-receiving section. A first range corresponding to a portion of a pupil range of the projection lens section is assigned for projection, and the light-receiving section includes a light-shielding part that performs light-shielding of a selective part corresponding to the first range, at a position substantially optically conjugate with respect to an aperture of the projection lens section.

In the projection display unit according to an embodiment of the present disclosure, light emitted from the illumination section is modulated by the light valve, and thereafter is projected onto a projection surface by the projection lens section. Meanwhile, the optical device allows for splitting into the respective optical paths of the illumination section, the light valve, and the light-receiving section, thereby causing light incident via the projection lens section to be guided to the light-receiving section, thus making it possible to read object information on the projection surface. Actually, however, a portion of the light emitted from the illumination section leaks into the light-receiving section in some cases, which deteriorates an SN ratio in a captured image in some cases. Here, the first range of the pupil range of the projection lens section is assigned for projection, and the light-receiving section includes the light-shielding part that performs light-shielding of a selective part corresponding to the first range, at a substantially conjugate position with respect to the aperture of the projection lens section. This allows the light incident from the projection lens section to be received by the imaging device, whereas the light leaked into the light-receiving section from the illumination section is blocked by the light-shielding part, thus inhibiting the leaked light from reaching the imaging device.

According to the projection display unit of an embodiment of the present disclosure, the first range of the pupil range of the projection lens section is assigned for projection, and the light-receiving section includes the light-shielding part that performs light-shielding of a selective part corresponding to the first range, at a substantially conjugate position with respect to the aperture of the projection lens section. This inhibits the light leaked from the illumination section into the light-receiving section from reaching the imaging device in the light-receiving section, thus making it possible to suppress deterioration of the SN ratio. Hence, it becomes possible to suppress degradation in image quality of a captured image.

It is to be noted that effects described here are not necessarily limitative, and may be any of effects described in the present disclosure.

BRIEF DESCRIPTION OF DRAWINGS

FIG. 1 is a configuration diagram illustrating an example of an overall configuration of a projection display unit according to a first embodiment of the present disclosure.

FIG. 2 is a schematic diagram that describes a pupil range (F-number) assigned for projection, of a pupil range of a projection lens section illustrated in FIG. 1.

FIG. 3A is a schematic diagram illustrating an example of a light-shielding range corresponding to the pupil range assigned for projection illustrated in FIG. 2.

FIG. 3B is a schematic diagram illustrating another example of the light-shielding range corresponding to the pupil range assigned for projection illustrated in FIG. 2.

FIG. 4 illustrates a change in an MTF in accordance with a combination of F-numbers of an opening and a light-shielding part of a light-receiving section.

FIG. 5 is a schematic diagram that describes F-numbers of the opening and the light-shielding part of the light-receiving section.

FIG. 6A is a characteristic diagram illustrating ideal MTFs in accordance with changes in F-numbers of the opening and the light-shielding part in a case where an imaging device has a high resolving power.

FIG. 6B is a characteristic diagram illustrating ideal MTFs in accordance with changes in F-numbers of the opening and the light-shielding part in a case where the imaging device has a low resolving power.

FIG. 7A is a characteristic diagram illustrating a relationship between intensity and an angle of each of light incident on a projection surface and light reflected from the projection surface.

FIG. 7B is a schematic diagram that describes a method for measuring the angle illustrated in FIG. 7A.

FIG. 8 is a schematic diagram that describes an optical path upon projection.

FIG. 9 is a schematic diagram that describes an optical path upon imaging.

FIG. 10 is a schematic diagram that describes workings of an optical device (PBS).

FIG. 11 is a schematic diagram that describes workings of a light-shielding member.

FIG. 12A is a schematic diagram that describes a signal intensity distribution and a light-shielding range with respect to a pupil diameter.

FIG. 12B is a schematic diagram that describes the signal intensity distribution and the light-shielding range with respect to the pupil diameter.

FIG. 12C is a schematic diagram that describes the signal intensity distribution and the light-shielding range with respect to the pupil diameter.

FIG. 13 is a configuration diagram illustrating an example of an overall configuration of a projection display unit according to a second embodiment of the present disclosure.

FIG. 14 is a schematic diagram illustrating a detailed configuration of a light-receiving section illustrated in FIG. 13.

FIG. 15 is a schematic diagram illustrating a configuration example of a light-shielding mask illustrated in FIG. 14.

FIG. 16 is a configuration diagram illustrating an example of an overall configuration of a projection display unit according to Modification Example 1.

FIG. 17 is a schematic diagram that describes a pupil range (F-number) assigned for projection, of a pupil range of a projection lens section illustrated in FIG. 16.

FIG. 18 is a schematic diagram that describes workings of a light-shielding member (aperture).

FIG. 19 is a schematic diagram illustrating a configuration example of a lens array (fly-eye lens) to be disposed in an illumination section according to Modification Example 2.

FIG. 20 is a schematic diagram illustrating a configuration example of a lens array to be used for a typical illumination section.

FIG. 21 is a schematic diagram that describes a pupil range (F-number) for projection in Modification Example 2.

FIG. 22 is a schematic diagram illustrating an example of a light-shielding range corresponding to the pupil range for projection illustrated in FIG. 21.

FIG. 23 is a schematic diagram illustrating another example of the light-shielding range corresponding to the pupil range for projection illustrated in FIG. 21.

FIG. 24 is a schematic diagram that describes pupil division according to Modification Example 3-1.

FIG. 25A is a schematic diagram illustrating an example of a light-shielding range in the pupil division illustrated in FIG. 24.

FIG. 25B is a schematic diagram illustrating another example of the light-shielding range in the pupil division illustrated in FIG. 24.

FIG. 26 is a schematic diagram that describes pupil division according to Modification Example 3-2.

FIG. 27A is a schematic diagram illustrating an example of a light-shielding range in the pupil division illustrated in FIG. 26.

FIG. 27B is a schematic diagram illustrating another example of the light-shielding range in the pupil division illustrated in FIG. 26.

FIG. 28 is a schematic diagram that describes pupil division according to Modification Example 3-3.

FIG. 29A is a schematic diagram illustrating an example of a light-shielding range in the pupil division illustrated in FIG. 28.

FIG. 29B is a schematic diagram illustrating another example of the light-shielding range in the pupil division illustrated in FIG. 28.

FIG. 30 illustrates a configuration of a main part of a projection display unit according to Modification Example 4-1.

FIG. 31 illustrates a configuration of a main part of a projection display unit according to Modification Example 4-2.

FIG. 32 illustrates a configuration of a main part of a projection display unit according to Modification Example 4-3.

FIG. 33 is a schematic diagram illustrating a configuration of a projection display unit according to another modification example.

MODES FOR CARRYING OUT THE INVENTION

Some embodiments of the present disclosure are described below in detail with reference to the drawings. It is to be noted that the description is given in the following order.
1. First Embodiment (A projection display unit in which a projection lens section is subjected to pupil division and a light-shielding member is disposed at an aperture position of a relay optical system of a light-receiving section)
2. Second Embodiment (A projection display unit in which a light-shielding mask and a lens are disposed for each pixel on a light-shielding surface of an imaging device in a light-receiving section)
3. Modification Example 1 (Another example of pupil division: an example in which a middle part is used for imaging and a circumferential part is used for projection)
4. Modification Example 2 (Another example of pupil division: an example in which division is performed into an upper part and a lower part separately for imaging and projection)
5. Modification Examples 3-1 to 3-3 (Other examples of pupil division: examples in which a shape of a pupil range for projection is set polygonal)
6. Modification Examples 4-1 to 4-3 (Other examples of each of a light valve and an optical device)

1. First Embodiment

[Configuration]
FIG. 1 illustrates an overall configuration of a projection display unit (a projection display unit 1) according to a first embodiment of the present disclosure. The projection display unit 1 has functions of performing image display (image projection) as well as object detection (imaging).

The projection display unit 1 includes, for example, an illumination section 10, a light valve 21, a light-receiving section 20 that includes an imaging device 22, a PBS 23, and a projection lens section 30. The projection display unit 1 further includes, for example, an illumination controller 40 that controls driving of each light source of the illumination section 10, and an image processor 41 that implements various types of image processing (signal processing) on an imaging signal obtained by the imaging device 22.

The illumination section 10 includes one or a plurality of light sources. Here, the illumination section 10 includes a plurality of semiconductor lasers, specifically, a red laser 11R, a green laser 11G, and a blue laser 11B, as an example. The illumination section 10 is an optical system that uniformizes beams of light emitted from the red laser 11R, the green laser 11G, and the blue laser 11B along a direction Z1, while synthesizing the beams of light. The illumination section 10 includes, for example, the red laser 11R, the green laser 11G, the blue laser 11B, a first dichroic mirror 131, a second dichroic mirror 132, a first condenser lens 161, a first fly-eye lens 151, a second condenser lens 162, a mirror 18, a third condenser lens 163, a second fly-eye lens 152, a fourth condenser lens 164, and a fifth condenser lens 165.

The red laser 11R is a light source that emits red laser light as an S polarization component (or a P polarization component), for example. The green laser 11G is a light source that emits, for example, green laser light as an S polarization component (or a P polarization component), for example. The blue laser 11B is a light source that emits, for example, blue laser light as an S polarization component (or a P polarization component), for example.

The illumination controller 40 performs emission control of each of the red laser 11R, the green laser 11G, and the blue laser 11B. For example, the illumination controller 40 performs the emission control for each of the red laser 11R, the green laser 11G, and the blue laser 11B by means of a field sequential method.

For example, the first dichroic mirror 131 selectively transmits the red laser light emitted from the red laser 11R, while selectively reflecting the green laser light emitted from the green laser 11G. The second dichroic mirror 132 selectively transmits the red laser light and the green laser light that are outputted from the first dichroic mirror 131, while selectively reflecting the blue laser light emitted from the blue laser 11B. This allows color synthesis (optical path synthesis) of the read laser light, the green laser light, and the blue laser light to be performed.

The first fly-eye lens 151 and the second fly-eye lens 152 are each an optical member (integrator) in which a plurality of lenses are two-dimensionally disposed on a substrate, and each spatially divide an incident light flux in accordance with an arrangement of the plurality of lenses to output the divided incident light flux. The first fly-eye lens 151 is disposed, for example, on an optical path between the first condenser lens 161 and the second condenser lens 162. The second fly-eye lens 152 is disposed, for example, on an optical path between the third condenser lens 163 and the fourth condenser lens 164. The first fly-eye lens 151 and the second fly-eye lens 152 allows for uniformization of in-plane light amount distribution and angle distribution of light (illumination light L11) emitted from the illumination section 10.

The mirror 18 is disposed on an optical path between the second condenser lens 162 and the third condenser lens 163.

The first condenser lens 161 condenses light outputted from the second dichroic mirror 132 and causes the condensed light to be incident on the first fly-eye lens 151. The second condenser lens 162 and the third condenser lens 163 condense light outputted from the first fly-eye lens 151 and cause the condensed light to be incident on the second fly-eye lens 152 via the mirror 18. The fourth condenser lens 164 and the fifth condenser lens 165 condense light outputted from the second fly-eye lens 152 and output the condensed light as the illumination light L11 toward the PBS 23.

The illumination section 10 is configured to uniformize pupil distribution of the illumination section 10 and to uniformize intensity distribution of the illumination light to the light valve. Here, in the present embodiment, the projection lens section 30 is subjected to pupil division, and a range of a portion of the projection lens section 30 is assigned for projection, as described later. Accordingly, it is desirable that a laser light source be used as a light source, and that etendue be designed to be small in such a degree as to satisfy an F-number for projection described later. The use of the laser light source makes it easier to design the etendue to be small in principle.

The PBS (polarizing beam splitter) 23 is a polarization separation device that outputs different polarization components (the P polarization component and the S polarization component) in directions different from each other. For example, the PBS 23 is configured to transmit a first polarization component (e.g., the P polarization component) of incident light, and to reflect a second polarization component (e.g., the S polarization component) of the incident light. The PBS 23 allows for splitting into respective optical paths of the illumination section 10, the light-receiving section 20, and the light valve 21 (optical paths along directions, i.e., Z1 to Z3, of respective optical axes). The PBS 23 is disposed at a splitting point of the respective optical paths that pass through the illumination section 10, the light-receiving section 20, and the light valve 21.

As an example, the PBS 23 is configured to output (reflect), along the direction Z2, a most portion of the first polarization component (e.g., the S polarization component) included in the illumination light L11 incident along the direction Z1, and to output (transmit), along a direction Z4, a most portion of the second polarization component (e.g., the P polarization component) included in light outputted from the light valve 21. The PBS 23 is also configured to output (reflect), along the direction Z3, a most portion of the first polarization component (e.g., the S polarization component) included in light (detection light L3) incident thorough the projection lens section 30 (along a direction Z5). The disposition of such a PBS 23 causes the light having been emitted from the illumination section 10 and having passed through the light valve 21 to be guided to the projection lens section 30, while causing the light incident via the projection lens section 30 to be guided to the light-receiving section 20.

It is to be noted that the PBS 23 of the present embodiment corresponds to a specific example of an "optical device" of the present disclosure. However, the optical device of the present disclosure is not limited to such a PBS, but may be, for example, an optical device that allows for splitting into the respective optical paths of the illumination section 10, the light-receiving section 20, and the light valve 21. For example, a so-called wire grid, etc. may be used as the optical device. However, the use of the PBS makes it possible to reduce loss of an optical amount as in the present embodiment.

The light valve 21 is, for example, a reflection-type liquid crystal device such as a liquid crystal on silicon (LCOS). For example, the light valve 21 modulates, on the basis of an image signal, the illumination light L11 (e.g., the S polarization component) incident along the direction Z2 via the PBS 23. The light valve 21 further outputs the light after the modulation along the direction Z4 via the PBS 23. The light valve 21 outputs a polarization component (e.g., the P polarization component) having a polarization state that is rotated from the polarization state upon the incidence. It is to be noted that the light valve 21 is able to perform black display by returning the incident polarization component to the PBS 23, with the polarization state being as it is.

The light-receiving section 20 includes, for example, the imaging device 22, a relay optical system 50, and an aperture 24. The imaging device 22 is configured by a solid-state imaging device such as a complementary metal-oxide semiconductor (CMOS) and a charge coupled device (CCD). Detection light is incident on the imaging device 22 along the direction Z3 via the projection lens section 30 and the PBS 23.

The relay optical system 50 is disposed, for example, on an optical path between the imaging device 22 and the PBS 23, and includes one or more relay lens groups (a first relay lens group 51 and a second relay lens group 52) having positive power. The first relay lens group 51 and the second relay lens group 52 each include at least one lens.

The aperture 24 is disposed on an optical path between the first relay lens group 51 and the second relay lens group 52. In the present embodiment, the aperture 24 is disposed at a pupil position of the projection lens section 30, i.e., at an optically conjugate position with respect to an aperture 31 of the projection lens section 30. A selective region of an opening of the aperture 24 is light-shielded. A light-shielding member (a light-shielding member 24M) described later is disposed.

The image processor 26 performs various types of signal processing on the basis of imaging signals outputted from the imaging device 22.

The projection lens section 30 projects, onto a projection surface 400, the modulated light (image light) incident along the direction Z4 via the PBS 23 from the light valve 21. Further, the detection light (the detection light L3) is incident via the projection lens section 30. In other words, the projection lens section 30 serves both as a projection optical system for projection of an image and as an image-forming optical system for detection of an object. The projection lens section 30 may be any of an ultra-short focus type, a wide-angle type, and a standard type, for example. Here, a case of the ultra-short focus type is exemplified as an example.

The projection lens section 30 includes, for example, a plurality of lenses (or lens groups) 301 to 305, the aperture 31, and mirrors 32 and 33. The projection lens section 30 has a throw ratio of 0.38 or less, for example. As used herein, the throw ratio corresponds to a ratio between a distance from the projection lens section 30 to the projection surface 400 and a width of an image displayed on the projection surface 400.

Adopting such an ultra-short focus type allows for, for example, the following advantages. (A) It becomes possible to perform imaging of an object (e.g., a card or a document) placed on a table or a floor, while projecting an image on the table, the floor, or the like. (B) It becomes possible to detect a pattern of grain, etc. of a table or a floor, while projecting an image onto the table, the floor, or the like, and to feed back the detected pattern to the projected image. It becomes possible to make the image look beautiful without being colored even on the pattern such as the grain.

Adopting the ultra-short focus type as the projection lens section 30 allows for a wider application range in a use application where, for example, the projection surface 400 is set on a desk top. However, the projection lens section 30 is not limited to the ultra-short focus type; a projection lens of another angle of view may also be adopted.

(Concerning Pupil Division and Selective Light-Shielding)

In the present embodiment, in accordance with the so-called pupil division, a first range corresponding to a portion of a pupil (pupil range) of the projection lens section 30 is assigned for projection. FIG. 2 illustrates one example thereof.

The pupil range (A0) of the projection lens section 30 is determined by an opening of the aperture 31, and has a circular shape with an optical axis Z as a center, for example, as illustrated in FIG. 2. Here, the first range (A1) for projection is assigned to a middle region including the optical axis Z, of the pupil range A0 of the projection lens section 30. Accordingly, an F-number (F-number corresponding to the pupil range A0) of the projection lens section 30 is designed to be smaller than an F-number (F-number corresponding to the range A1) of the illumination section 10. This causes the modulated light from the light valve 21 based on the illumination light to pass through a portion (the range A1) of the pupil range of the projection lens section 30 and to be guided onto the projection surface 400. In the present embodiment, it is desirable that the F-number of the illumination section 10 be 2 or more. One reason for this is that the illumination section 10 having an F-number of 2 or more allows for obtainment of sufficient resolving power in a case where an F-number of an imaging pupil is set to about 1.7, because of difficulty in terms of design in manufacturing the projection lens section 30 having an F-number less than 1.7. The range A1 has a circular shape, for example. This is achievable, for example, by making an angle distribution isotropic using a fluorescent material and a laser light source (or an LED light source), or by making a surface shape of each lens of the first fly-eye lens 151 circular.

The light-receiving section 20 includes the light-shielding member (the light-shielding member 24M) that performs light-shielding of a selective part corresponding to the range A1 for projection at a position substantially optically conjugate with respect to the aperture 31 of the projection lens section 30.

The light-shielding member 24M is disposed to cover the selective part corresponding to the range A1 of the opening of the aperture 24, for example. It is sufficient for the light-shielding member 24M to reduce a transmittance of incident light (e.g., visible light); the light-shielding member 24M is not limited to a member that completely blocks passage of light (a member that makes a light transmittance zero). Further, it is desirable that the light-shielding member 24M be disposed at a position of the aperture 24 that is optically conjugate with respect to the aperture 31 of the projection lens section 30. However, the light-shielding member 24M may be disposed at a position slightly shifted from the aperture 24. The light-shielding member 24M corresponds to an example of a "light-shielding part" of the present disclosure.

FIG. 3A and FIG. 3B each illustrate an example of a light-shielding range (a light-shielding range M1) of the light-shielding member 24M. Here, the aperture 24 of the light-receiving section 20 is disposed at an optically conjugate position with respect to the aperture 31 of the projection lens section 30, and the pupil range A0 in the projection lens section 30 is equivalent to a pupil range (set as A0) in the light-receiving section 20. Accordingly, for example, the light-shielding member 24M is provided to selectively perform light-shielding of a region corresponding to the range A1 for projection, of the pupil range A0 of the light-receiving section 20, as illustrated in FIG. 3A. Here, the light-shielding range M1 is substantially coincident with a part corresponding to the range A1 for projection. A circumferential region (outer region) of the range A1 (the light-shielding range M1) serves as an optical path for imaging (a range A2). The range A2 corresponds to an annular part along an outer circumference of the opening of the aperture 24. In this manner, the pupil range A0 (the opening of the aperture 24) in the light-receiving section 20 is divided into the two ranges A1 and A2, for example. Further, the light-shielding range M1 light-shielded by the light-shielding member 24M is designed to perform light-shielding of the part corresponding to the range A1 for projection, of the pupil range A0.

However, the part corresponding to the range A1 and the light-shielding range M1 may not necessarily be coincident with each other completely. As illustrated in FIG. 3B, for example, the light-shielding range M1 may be designed to be slightly larger than the part corresponding to the range A1. Further, in this example, the light-shielding range M1 has a circular shape that is the same as that of the range A1. However, the shape of the light-shielding range M1 is not limited to the circular shape, but may be a polygonal shape as described later. Such a light-shielding member 24M blocks light leaked into the light-receiving section 20 from the illumination section 10, thus inhibiting the leaked light from reaching the imaging device 22, although the detail is described later.

(Suitable Range of Light-Shielding)

In the light-receiving section 20, it is desirable that the following conditional expression (1) be satisfied:

$$0.2 \leq S_{OBJ}/S_{ALL} \leq 0.8 \quad (1)$$

where $S_{ALL}$ denotes total area of the pupil range A0 (the opening of the aperture 24), and SORT denotes area of the part (the light-shielding range M1) light-shielded by the light-shielding member 24M.

An upper value (0.8) of the conditional expression (1) is calculated from a numerical value (0.9×0.9=0.81) as a result of conversion of a conditional expression (2) described later in area. Further, a lower value (0.2) of the conditional expression (1) is calculated by inverting conditions of the light-shielding part and the opening (1−0.8=0.2) to achieve high resolving power even in a case of Modification Example 1, etc. described later (a case where a positional relationship between the range for projection and the range for imaging is inversed as compared with the present embodiment). Satisfying such a conditional expression (1) suppresses a shortage of an optical amount, thus making it possible to achieve a sufficient light-shielding effect. Further, it is also possible to suppress unnecessary increase in size of the projection lens section 30.

Incidentally, it is to be noted that, in the light-receiving section 20, the light amount (light-receiving amount) and the resolving power are desirably taken into consideration in a case where the selective part of the pupil range A0 is light-shielded as described above. For example, as in the present embodiment, in a case where the middle part of the pupil range A0 of the projection lens section 30 is assigned to the range A1 for projection (for illumination light), the range A2 for imaging (for detection light) is set to the part on side of the outer circumference of the pupil range A0 in the light-receiving section 20, as described above. Accordingly, there is a concern about lowering of the resolving power due to so-called apodization (a change in the optical amount from the middle part to the circumferential part) in the light-receiving section 20 (the imaging device 22).

FIG. 4 illustrates, as an example, a maximum resolution of Modulation Transfer Function (MTF (theoretical value)) in a case where a F-number of F/4 is assigned to the range A1 for projection and where imaging is performed in a state in which the part corresponding to the range A1 is light-shielded. It is to be noted that the image sensor panel size is set to 0.37 inches, a projection angle of view is set to 75°, and a target resolving power is set to wide extended graphics array (WXGA) that is equivalent to 1,366×768 pixels. Further, FIG. 4 also illustrates an F-number (F/d2) of an opening B2 and an F-number (F/d1) of the light-shielding part (the light-shielding range M1 light-shielded by the light-shielding member 24M) in the light-receiving section 20. It is to be noted that a diameter d2 corresponds to a diameter of the opening (the opening of the aperture 24) B2 corresponding to the pupil range A0, and a diameter d1 corresponds to a diameter of the light-shielding range M1, as illustrated in FIG. 5. The vertical axis in FIG. 5 represents signal intensity of light received in the imaging device 22. In this manner, a light-receiving signal is not obtained in the region corresponding to the light-shielding range M1, and the light-receiving signal is obtained only in the outside region (the range A2).

Here, it is desirable that an F-number of the light-shielding range M1 be designed to be substantially the same as the F-number of the illumination section 10 (the F-number of the range A1). One reason for this is that the light leaked into the light-receiving section 20 via the PBS 23 from the illumination section 10 has substantially the same F-number as the illumination light, and that a most portion of such light is desirably blocked. Meanwhile, it is possible for the F-number of the opening B2 to be freely designed, but too small F-number of the opening B2 results in too large diameter of the projection lens section 30. This increases a cost as well as a product size. As an index of a general performance evaluation, MTF of 30% or more is sufficient; MTF of 60% or more conversely makes it difficult to determine, by visual inspection, a difference from a case where light-shielding is not performed. From those described above, it is desirable that MTF be designed to be in a range from 30% to 60%. In this case, an optical design may be performed to satisfy, for example, the following conditional expression (3):

$$F_{OBJ} \times 0.75 \leq F_{OPE} \leq F_{OBJ} \times 0.6 \quad (3)$$

where $F_{OPE}$ denotes an F-number of the opening B2 of the light-receiving section 20, and $F_{OBJ}$ denotes an F-number of the light-shielding range M1.

Of the conditional expression (3), an upper value concerns the product size and the cost. Accordingly, in a case where the product size and the cost are not taken into consideration, designing may be performed to satisfy the following conditional expression (4).

$$F_{OBJ} \times 0.75 \leq F_{OPE} \quad (4)$$

Satisfying the conditional expression (3) or the conditional expression (4) makes it possible, for the light-receiving section 20 (the imaging device 22), to obtain resolving power (high resolving power) equivalent to a projected image.

However, in a case where it is not necessary to perform imaging of a size equivalent to a pixel size of a projected image (where no high resolving power is necessary), it is possible to set a restriction on the F-number of each of the opening and the light-shielding part more loosely than the foregoing conditional expression (4). Here, FIG. 6A illustrates plotted numerical values in FIG. 4, as a change in MTF in a case of high resolving power. Meanwhile, FIG. 6B illustrates a change in MTF in a case of low resolving power (e.g., a three-pixel resolving power). From this result, the F-number of each of the opening and the light-shielding part may satisfy the following conditional expression (2).

$$F_{OBJ} \times 0.9 \leq F_{OPE} \qquad (2)$$

In general, a reason for incorporating an image sensor coaxial with the projection lens is to suppress distortion in a captured image and to secure resolving power. Accordingly, resolving power rougher than the three-pixel resolving power conversely results in reduced advantage in incorporating the image sensor in terms of costs. Hence, it is desirable that the foregoing conditional expression (2) be satisfied in consideration of minimum resolving power.

It is to be noted that, from the viewpoint of an optical amount, designing is desirably performed to sufficiently secure an optical amount as well similarly to the above-described resolving power, although it depends on a gain of the imaging device 22. In a case of shortage, it is desirable to reduce the F-number corresponding to the range A2 for imaging, or to reduce the F-number of the projection lens section 30.

[Workings and Effects]

In the projection display unit 1, light (illumination light) emitted from the illumination section 10 is modulated by the light valve 21, and thereafter projected onto the projection surface 400 via the projection lens section 30. Meanwhile, the PBS 23 allows for splitting into the respective optical paths of the illumination section 10, the light valve 21, and the light-receiving section 20, thereby causing light (detection light) incident via the projection lens section 30 to be guided to the light-receiving section 20, thus making it possible to read information on the projection surface 400.

Here, the projection surface 400 is a surface of, for example, a table, a floor, a screen, and the like, and is considered to be a matte surface. Light incident on such a surface is diffused and reflected in all directions by so-called Lambertian reflectance, and is diffused uniformly regardless of a projection direction. Accordingly, upon imaging, the light incident via the projection lens section 30 (return light to the projection lens section 30) passes through an entire region of the pupil range.

FIG. 7A illustrates a relationship of a light intensity distribution with respect to an angle between projected light (incident light) onto a middle part of the projection surface 400 and return light (reflected light) from the projection surface 400 in a case where an ultra-short focus lens is used as the projection lens section 30. It is to be noted that the angle between the projected light and the return light is in a range from −90° to +90°, with a direction perpendicular to the projection surface 400 being set as 0°, as illustrated in FIG. 7B.

As described above, actually, a path (pass-through optical path, pass-through light flux) of the projected light onto the projection surface 400 and a path of the return light from the projection surface 400 have different diameters. Specifically, the diameter of the return light incident on the projection lens section 30 is larger than the diameter of the projected light outputted from the projection lens section 30. The present applicant has focused attention on this difference to find that it is possible to selectively perform light-shielding of the optical path from the illumination section 10 to the light-receiving section 20, while achieving both the projection function and the imaging function, by performing the pupil division as well as light-shielding of a selective region of the pupil range in the projection display unit 1 that incorporates the imaging device 22. The detail is described below.

(Optical Path Upon Projection)

FIG. 8 schematically illustrates an optical path upon projection. It is to be noted that FIG. 8 omits illustration of each of the illumination controller 40 and the image processor 41. As illustrated, upon projection, the illumination light L11 (e.g., the S polarization component) emitted along the direction Z1 from the illumination section 10 is reflected at the PBS 23, and thereafter is incident as light L12 on the light valve 21. The light L12 is modulated on the basis of an image signal in the light valve 21 to thereby allow the polarization state to be converted (e.g., into the P polarization component), and is reflected toward the PBS 23. Light L13 (e.g., the P polarization component) after the modulation performed by the light valve 21 is transmitted through the PBS 23, and is incident on the projection lens section 30 along the direction Z4.

The optical path (light flux) of the light L13 incident on the projection lens section 30 passes through a portion of the opening of the aperture 31, i.e., a region corresponding to the range A1 (the middle part in this example) of the pupil range A0 of the projection lens section 30, and is projected as projected light L2 toward the projection surface 400.

(Optical Path Upon Imaging)

FIG. 9 schematically illustrates an optical path upon imaging. It is to be noted that FIG. 9 omits illustration of each of the illumination controller 40 and the image processor 41. As illustrated, upon imaging, when light (the detection light L3) reflected in a Lambertian manner from the projection surface 400 is incident on the projection lens section 30, the light passes through an entire region of the pupil range A0, and is guided as light L31 along the direction Z5 toward the PBS 23. Here, the Lambertian-reflected light contains 50% P polarization component and 50% S polarization component. However, the PBS 23 causes, for example, only the S polarization component to be reflected in the direction Z3. In this manner, light L32 outputted from the PBS 23 reaches the imaging device 22 via the relay optical system 50.

Here, in the illumination section 10, use of a laser light source, for example, enables the illumination light L11 to be unified to one of the P polarization component and the S polarization component. Which of the P polarization component and the S polarization component is to be adopted as the polarization component of the illumination light L11 may be selected depending on characteristics of the PBS 23.

It is difficult, however, to actually configure the illumination light L11 only by one of the polarization components, and to completely limit the other polarization component to zero (0). The illumination light L11 contains the P polarization component (or the S polarization component) at 99% or more, more preferably at 99.5% or more; however, the S polarization component (or the P polarization component) is slightly present. FIG. 10 illustrates examples thereof. As illustrated, the illumination light L11 incident on the PBS 23 slightly contains the P polarization component (0.5%) even in a case where the S polarization component is dominant (99.5%), for example. Accordingly, a most portion of the S polarization component (the light L12) is reflected at the PBS 23 to be incident on the light valve 21. However, the P polarization component slightly contained in the illumination light L11 is transmitted through the PBS 23 to result in leaked light (stray light) L14 that travels toward the light-receiving section 20 (the imaging device 22). Such leaked light L14 results in unnecessary light on a receiving surface of the imaging device 22, thus deteriorating an SN ratio of imaging information on the projection surface 400.

In order to cut the unnecessary light, there is a method that uses, for example, a wire grid as the polarization separation device to provide a polarizer between the wire grid and the image sensor. In this method, however, the use of the wire grid is indispensable, thus causing loss of an optical amount of projection. Further, a small-sized projector has a small exothermic mechanism, and thus is often set to have a small optical amount of emission. Accordingly, it is desired to reduce the loss of the optical amount as much as possible.

Further, there is also a method that uses the PBS as the polarization separation device and uses a band-pass filter to cut visible light. In this method, however, it is not possible to receive visible light. This impairs convenience of a user. For example, it is not possible to take in a color image such as a photograph on a table, as in a document camera. In addition, it is difficult to apply the method to such a known technique, in which a projection pattern is corrected depending on grain to look natural in a case where projection is performed onto a grained table. Further, it is difficult, in principle, to perform imaging of a projected image per se. Accordingly, it is difficult to perform auto-focusing as in a contrast auto focus (AF), for example.

Alternatively, there is also a technique that performs imaging in a state where no image is projected. In this method, however, it is difficult to perform imaging in a dark place. Further, it is possible to perform correction on the grained table, etc. to a certain degree. However, relevance between RGB projected light and environmental illumination light is not defined uniquely, thus failing to obtain natural correction in some cases. Furthermore, it is not possible to obtain a projected image, thus making it difficult to apply this method to the AF.

Meanwhile, in the present embodiment, in accordance with the pupil division, the range A1 that is a portion of the pupil range of the projection lens section 30 is assigned for projection, and the light-receiving section 20 is provided with the light-shielding member 24M that performs light-shielding of a selective part corresponding to the range A1 at a substantially conjugate position with respect to the aperture of the projection lens section 30.

In accordance with this pupil division, the detection light L3 incident from the projection lens section 30 passes through the entire region of the pupil range A0 of the projection lens section 30, and is incident on the light-receiving section 20 via the PBS 23. The light L32 incident on the light-receiving section 20 passes through the region (the range A2), of the pupil range A0, outside the light-shielding member 24M, and reaches the imaging device 22. Meanwhile, as schematically illustrated in FIG. 11, the light L14 leaked into the light-receiving section 20 from the illumination section 10 is blocked by the light-shielding member 24M. This inhibits the light L14 from reaching the imaging device 22.

FIGS. 12A, 12B, and 12C illustrate a relationship between a light-shielding range light-shielded by the above-described light-shielding member 24M and a signal intensity distribution. In a case where the signal intensity distribution of the light (the light L32 and the light L14) traveling toward the light-receiving section 20 from the PBS 23 is as illustrated in FIG. 12A, for example, it is desirable to use the light-shielding member 24M that performs light-shielding of a region substantially coincident with the range A1 as illustrated in FIG. 12B. This makes it possible to selectively receive only the light L32 having passed through the range A2 as illustrated in FIG. 12C. When the range A1 and the light-shielding range M1 light-shielded by the light-shielding member 24M are equal to each other in this manner, it is theoretically possible to cut entire leaked light L14. Alternatively, even though the entire leaked light L14 is not able to be cut, it is possible to sufficiently reduce the leaked light L14. For example, in a projector that performs image display at about 100 [lm], it is possible to reduce illuminance of the leaked light L14 incident on the imaging device 22 to about 10 [lux], for example. In this case, it is possible to improve the SN ratio to about 4:1.

According to the projection display unit 1 of the present embodiment, the range A1 of the pupil range A0 of the projection lens section 30 is assigned for projection, and the light-receiving section 20 includes the light-shielding member 24M that performs light-shielding of a selective part corresponding to the range A1 at a substantially conjugate position with respect to the aperture 31 of the projection lens section 30. This enables the light-receiving section 20 to inhibit the leaked light L14 from reaching the imaging device 22 from the illumination section 10, thus suppressing deterioration in the SN ratio. Hence, it is possible to suppress degradation in quality of a captured image.

Further, in the present embodiment, it is possible to selectively cut the leaked light L14 from the illumination section 10 without using a visible light cut filter, etc. as described above. Hence, it is possible for the light-receiving section 20 to detect visible light, and thus to take in, as an image, a photograph placed on the projection surface 400.

Furthermore, it is possible to take in an image having a favorable SN ratio even during a period when the illumination section 10 is driven to emit light. In other words, it becomes possible to perform projection and imaging at the same time. This leads to an effective solution for application to auto focusing performed by the contrast AF, or for high-accuracy grain correction. Further, in a dark surrounding environment, it is also possible to perform imaging while illuminating light onto the projection surface 400 using light on projection side (light from the illumination section 10).

In addition, adopting a coaxial detection system that incorporates the imaging device 22 coaxial with the projection lens section 30 allows for a compact configuration, thus making it possible to achieve reduction in size of the product. Further, when the ultra-short focus lens is adopted as the projection lens section 30, imaging using an external camera may result in occurrence of distortion, or slow signal processing due to imaging depth, thus leading to difficulty in the correction, in some cases. In the coaxial detection system, the above does not occur in principle, thus making it possible to simplify signal processing.

Description is given below of another embodiment and modification examples of the present disclosure. It is to be noted that, the same components as those of the foregoing first embodiment are denoted by the same reference numerals, and the descriptions thereof are omitted as appropriate.

Second Embodiment

[Configuration]

FIG. 13 illustrates an overall configuration of a projection display unit (a projection display unit 1A) according to a second embodiment of the present disclosure. It is to be noted that FIG. 13 omits illustration of each of the illumination controller 40 and the image processor 41. The projection display unit 1A, similarly to the projection display unit 1 of the foregoing first embodiment, has the projection function and the imaging function. The projection display unit 1A includes, for example, the light valve 21, a light-receiving section (a light-receiving section 20A) that includes the imaging device 22, the PBS 23, and the projection lens section 30. FIG. 13 illustrates optical paths (optical paths of the light L31 and the light L32) upon imaging, as an example.

In the present example as well, in accordance with the pupil division, the range A1 corresponding to a portion of the pupil range A0 of the projection lens section 30 is assigned for projection, similarly to the projection display unit 1 of the foregoing first embodiment. Further, the light-receiving section 20A includes a light-shielding member (a light-shielding mask 22M described later) that performs light-shielding of a selective part corresponding to the range A1 for projection at a position substantially optically conjugate with respect to the aperture 31 of the projection lens section 30.

In the present embodiment, however, the light-receiving section 20A is configured not to use the relay optical system 50 and the aperture 24. FIG. 14 illustrates a detailed configuration of the light-receiving section 20A. As illustrated in FIG. 14, the light-receiving section 20A includes a micro-lens array 22a on light-receiving side of the imaging device 22. Lenses 22a1 of the micro-lens array 22a are provided, on a one-to-one basis, for respective pixels (pixels P) of the imaging device 22. Each of the lenses 22a1 is designed to have a focal distance to allow the focus to be on a light-receiving surface S1 of the imaging device 22. The light-receiving surface S1 of the imaging device 22 and an image surface S2 to be formed on the micro-lens array 22a are in a conjugate relationship. This allows the light-receiving surface S1 of the imaging device 22 to be disposed on an optically conjugate position with respect to the aperture 31 of the projection lens section 30, and thus an image of a light flux having passed through the projection lens section 30 is formed for each of the pixels P on the light-receiving surface S1 of the imaging device 22.

In such a configuration, the light-shielding mask 22M is provided between the imaging device 22 and the micro-lens array 22a. FIG. 15 illustrates an example of the light-shielding mask 22M. The light-shielding mask 22M is provided, for each of the pixels P, on or in proximity to the light-receiving surface S1 of the imaging device 22. For example, the light-shielding mask 22M is disposed to perform light-shielding of a middle region, for example, as a selective region corresponding to the range A1.

In the projection display unit 1A of the present embodiment as well, the light (illumination light) emitted from the illumination section 10 is modulated by the light valve 21, and thereafter projected onto the projection surface 400 via the projection lens section 30, similarly to the projection display unit 1 of the foregoing first embodiment. Meanwhile, the PBS 23 allows for splitting into the respective optical paths of the illumination section 10, the light valve 21, and the light-receiving section 20A, thereby causing light (detection light) incident via the projection lens section 30 to be guided to the light-receiving section 20A, thus making it possible to read information on the projection surface 400.

In accordance with the pupil division, the range A1 that is a portion of the pupil range A0 of the projection lens section 30 is assigned for projection, and the light-receiving section 20A is provided with the light-shielding mask 22M that performs light-shielding of a selective part corresponding to the range A1 at a substantially conjugate position with respect to the aperture of the projection lens section 30. This allows the detection light L3 incident from the projection lens section 30 to pass through the entire region of the pupil range A0 of the projection lens section 30 and to be incident on the light-receiving section 20A via the PBS 23. The light L32 having been incident on the light-receiving section 20A is incident on the imaging device 22. At this time, as illustrated in FIG. 14, the light L32 having passed through the micro-lens array 22a thereafter travels through a region outside each light-shielding mask 22M, and reaches the imaging device 22. Meanwhile, light leaked into the light-receiving section 20A from the illumination section 10 is blocked by the light-shielding mask 22M. This inhibits the light from reaching the imaging device 22. Hence, it becomes possible to suppress deterioration of the SN ratio and thus to achieve effects similar to those of the foregoing first embodiment.

Further, in the present embodiment, unlike the foregoing first embodiment, the light-receiving section 20A is configured not to include the relay optical system 50.

Here, the relay optical system relays light having been formed once to form an image again on a small-sized imager, and thus tends to have a large number of lenses, for example, six or more lenses to obtain RGB color correction as well as proper resolving power. Further, in a case where correction is performed for light including a near infrared ray, a larger number of lenses are provided. Reasons for this are as follows. First, a position of intermediate image formation on an optical path is set near a lens, and telecentricity is secured. Second, the projection lens section 30 is generally configured to have a lens shift (optical axis shift), whereas the light-receiving optical system is configured not to have the lens shift, which causes optical axes not to coincide, thus making it difficult to sufficiently correct aberration. It is to be noted that, although the optical axes are to be coincident for the second reason, displacing an optical axis tends to increase a lens diameter, thus causing higher costs. Further, the relay optical system may lower the resolving power in some cases. There is a concern about lowering of the resolving power caused also by the light-shielding member as described above, thus resulting in difficulty in achieving desired resolving power in some cases. By adopting a configuration in which the light outputted from the PBS 23 is guided directly to the imaging device 22 as described in the present embodiment, it becomes possible to suppress decrease in the resolving power with a low-cost and compact configuration as compared with the case of using the relay optical system.

It is to be noted that, although the light-shielding mask 22M may be disposed for each of all the pixels P of the imaging device 22 in the second embodiment, this is not limitative; the light-shielding mask 22M may be disposed only for a selective pixel P. In other words, a configuration in which no light-shielding mask 22M is provided for some of the pixels P may be effective, for example, in cases, etc. where a light-receiving amount is desired to be increased, such as a case where the illumination section 10 fails to emit light.

In the foregoing embodiments, etc., the circular middle region of the pupil range A0 of the projection lens section 30 is assigned for the range A1 for projection, and the range A2 corresponding to its circumferential region is assigned for imaging. However, the method of the pupil division and a region assigned for projection are not limited to those described above. Other examples of the pupil division are given below.

Modification Example 1

FIG. 16 illustrates an overall configuration of a projection display unit (a projection display unit 1B) according to Modification Example 1 of the foregoing first embodiment.

FIG. 17 illustrates an example of the pupil division in the projection lens section 30 illustrated in FIG. 16. It is to be noted that FIG. 16 omits illustration of each of the illumination controller 40 and the image processor 41. The projection display unit 1B, similarly to the projection display unit 1 of the foregoing first embodiment, has the projection function and the imaging function. The projection display unit 1B includes, for example, the light valve 21, the light-receiving section 20 that includes the imaging device 22, the PBS 23, and the projection lens section 30. FIG. 16 illustrates optical paths (optical paths of light L11a and light L13a) upon projection, as an example.

In the present modification example as well, in accordance with the pupil division, a range (a range A3) corresponding to a portion of the pupil range A0 of the projection lens section 30 is assigned for projection, similarly to the projection display unit 1 of the foregoing first embodiment. Further, the light-receiving section 20A includes a light-shielding member (an aperture 25) that performs light-shielding of a selective part corresponding to the range A3 for projection at a position substantially optically conjugate with respect to the aperture 31 of the projection lens section 30.

In the present embodiment, however, the method of the pupil division, i.e., a region assigned for projection is different from that of the foregoing first embodiment. For example, as illustrated in FIG. 17, the range A3 for projection is set to a range on side of the outer circumference (annular region) of the pupil range A0. In this case, a substantial optical path for imaging is set to a range A4 that corresponds to a middle region including an optical axis Z. In other words, in the pupil range A0 of the light-receiving section 20A, the range A3 for projection is assigned to a circumferential region of the range A4 for projection.

The illumination section 10 includes an axicon lens 171 in order to perform projection using the annular range A3 of the pupil range A0 of the projection lens section 30. Specifically, the axicon lens 171 and a positive lens 172 are disposed on an optical path between the third condenser lens 163 and the second fly-eye lens 152. This enables the illumination light L11a (in-plane distribution of the illumination light L11a) to be formed into an annular shape, and thus to be incident on the PBS 23.

The light-receiving section 20 includes, for example, the imaging device 22, the relay optical system 50, and the aperture (the aperture 25). The aperture 25, similarly to the aperture 24 of the foregoing first embodiment, is disposed on an optical path between the first relay lens group 51 and the second relay lens group 52. Further, this aperture 25 is disposed at a pupil position of the projection lens section 30, i.e., at an optically conjugate position with respect to the aperture 31 of the projection lens section 30. However, in the present modification example, the aperture 25 serves as the light-shielding member that performs light-shielding of the circumferential region corresponding to the range A3 of the pupil range A0. In other words, the aperture 25 is disposed in such a state that an opening is narrower than that of the aperture 24 of the foregoing first embodiment.

In the projection display unit 1B of the present modification example as well, the light (the illumination light L11a) emitted from the illumination section 10 is modulated by the light valve 21, similarly to the projection display unit 1 of the foregoing first embodiment. The light L13a after the modulation passes through the annular range A3 of the pupil range A0 of the projection lens section 30, and is projected onto the projection surface 400. Meanwhile, the PBS 23 allows for splitting into the respective optical paths of the illumination section 10, the light valve 21, and the light-receiving section 20, thereby causing light (detection light) incident via the projection lens section 30 to be guided to the light-receiving section 20, thus making it possible to read information on the projection surface 400.

Further, in accordance with the pupil division, the range A3 that is a portion of the pupil range A0 of the projection lens section 30 is assigned for projection, and the light-receiving section 20 is provided with the aperture 25 that performs light-shielding of a selective part corresponding to the range A3 at a substantially conjugate position with respect to the aperture of the projection lens section 30. This allows the detection light incident from the projection lens section 30 to pass through the entire region of the pupil range A0 of the projection lens section 30 and to be incident on the light-receiving section 20 via the PBS 23, as described above. The light incident on the light-receiving section 20 passes through the aperture 25, to thereby cause the light having passed through the region corresponding to the range A4 to be received by the imaging device 22. Meanwhile, as schematically illustrated in FIG. 18, the light L14a leaked into the light-receiving section 20 from the illumination section 10 is the light that passes through the annular region corresponding to the range A3, and thus is blocked by the aperture 25. This inhibits the light L14a from reaching the imaging device 22. Hence, it becomes possible to suppress deterioration of the SN ratio and thus to achieve effects similar to those of the foregoing first embodiment.

It is to be noted that, similarly to the foregoing second embodiment, a configuration may be adopted in which a micro-lens array and a light-shielding mask that performs light-shielding of the annular region corresponding to the range A3 are disposed, with no relay optical system included in the light-receiving section 20.

Modification Example 2

FIG. 19 is a schematic diagram illustrating a configuration example of a lens array (fly-eye lens) to be disposed in an illumination section according to Modification Example 2. FIG. 20 is a schematic diagram illustrating a configuration example of a lens array to be used for a typical illumination section. FIG. 21 is a schematic diagram that describes a pupil range (F-number) for projection in Modification Example 2.

In the present modification example, a range (a range A5 described later) for projection is assigned to a region displaced to one side, of the pupil range A0 of the projection lens section 30. For example, a configuration is adopted in which the pupil division is performed in a vertical direction or a horizontal direction (here, the vertical direction is exemplified).

Here, a pupil size of the projection lens section 30 is set depending on a safety standard in a case where a laser light source is used. A restriction on the safety standard is determined by an average value between a major axis diameter and a minor axis diameter of a pupil shape. For example, in a case where an upper limit of the safety standard is equivalent to F/4, when dividing the pupil range evenly in the vertical direction or the horizontal direction, about F/2.6 and about F/5.2 are set (an average of about F/4 is set), respectively, in a major axis direction and in a minor axis direction of the shape after the division. However, this means that, in FIG. 6A, an F-number is set that is smaller than an F-number (F/3 or less) of the opening for obtaining MTF of 30% or more with respect to the light-shielding part of F/4. Accordingly, MTF at F/2.6 on major axis side and MTF at F/5.2 on minor axis side are, respectively, 84% on the major axis side and 68% on the minor axis side (each 84 LP/mm), thus making it possible to secure higher MTF than the mode illustrated in FIG. 6A.

In the present modification example, each individual lens 151a of the fly-eye lens, specifically, the first fly-eye lens 151 disposed in the illumination section 10 has a flattened hexagonal surface shape as illustrated in FIG. 19. Here, the first fly-eye lens 151, and the subsequent second condenser lens 162 and third condenser lens 163 serve to substantially uniformize pupil distribution. In general, the first fly-eye lens 151 is desired to have a close-packed structure of near-circular-shaped lenses, and thus the each individual lens 151a often has a surface shape of regular hexagon as illustrated in FIG. 20. Meanwhile, in the present modification example, the surface shape of each lens 151a of the first fly-eye lens 151 is changed to the flattened hexagon. FIG. 19 exemplifies the case of the division in the vertical direction; however, in a case of division in the horizontal direction, the shape is such that the configuration of FIG. 19 is rotated by 90°.

In the first fly-eye lens 151, the lens 151a has the flattened hexagonal surface shape, and has a configuration in which a lens apex (optical axis) is shifted form a center of the surface shape. This makes it possible to condense light on a region displaced to one side, of the pupil range A0 of the projection lens section 30 as illustrated in FIG. 21. For example, it is possible to assign a flattened hexagonal region (a range A5) that is a lower half of the pupil range A0, for projection.

In the present modification example as well, a selective region corresponding to the range A5 for projection is light-shielded at a position substantially optically conjugate with respect to the projection lens section 30 in the light-receiving section 20; FIG. 22 and FIG. 23 each illustrate an example of the light-shielding range M1 in this situation. The light-shielding range M1 may be a region corresponding to a lower half beneath the optical axis Z as illustrated in FIG. 22. Alternatively, the light-shielding range M1 may have a shape substantially coincident with the shape of the range A5 as illustrated in FIG. 23.

Modification Examples 3-1 to 3-3

FIG. 24 is a schematic diagram that describes a pupil range (F-number) for projection according to Modification Example 3-1. FIG. 25A and FIG. 25B each illustrate an example of the light-shielding range M1 in the Modification Example 3-1. FIG. 26 is a schematic diagram that describes a pupil range (F-number) for projection according to Modification Example 3-2. FIG. 27A and FIG. 27B each illustrate an example of the light-shielding range M1 in the Modification Example 3-2. FIG. 28 is a schematic diagram that describes pupil range (F-number) for projection according to Modification Example 3-3. FIG. 29A and FIG. 29B each illustrate an example of the light-shielding range M1 in the Modification Example 3-3.

In the foregoing first embodiment, the circular middle region is assigned to the range A1 for projection, and the circular light-shielding member 24M (the light-shielding range M1) substantially coincident with the range A1 is provided. However, the shape of each of the range for projection and the light-shielding range M1 is not limited to such a circular shape, but may be polygonal. Further, the surface shape of the range for projection and the surface shape of the light-shielding range may be different from each other. In this case, for example, the light-shielding range M1 light-shielded by the light-shielding member may have a shape circumscribed about a shape of a part corresponding to the range for projection.

Here, in a case where a laser light source of each color includes about four laser chips each using a fluorescent material having 1,000 [lm] or more in the illumination section 10, it is desirable to first uniformize the pupil distribution using the first fly-eye lens 151 for the reason of safety standard. Each lens of the first fly-eye lens 151 is set to have a surface shape that is polygonal, for example, hexagonal, rectangular, square, triangular, etc.; depending on this surface shape, the pupil distribution of light emitted by the illumination section 10 is formed.

In an example of FIG. 24, a range A6 for projection is formed in the middle region of the pupil range A0, and has a hexagonal shape. In this case, as illustrated in FIG. 25A, the light-shielding range M1 may have a circular shape that includes inside a region corresponding to the range A6. In detail, the light-shielding range M1 is a region corresponding to a circumcircle of the regular hexagon of the range A6. Alternatively, as illustrated in FIG. 25B, the light-shielding range M1 may have a shape that is substantially coincident with the shape of the range A6. In an example of FIG. 25B, it is possible to reduce loss of a light-receiving amount as compared with the example of FIG. 25A. In the example of FIG. 25A, manufacturing (positioning) is easier than the example of FIG. 25B.

In an example of FIG. 26, a range A7 for projection is formed in the middle region of the pupil range A0, and has a square shape. In this case as well, as illustrated in FIG. 27A, the light-shielding range M1 has a circular shape that includes inside a region corresponding to the range A7 (in detail, a region corresponding to a circumcircle of the square of the range A7). Alternatively, as illustrated in FIG. 27B, the light-shielding range M1 may have a shape that is substantially coincident with the shape of the range A7. In an example of FIG. 27B, it is possible to reduce loss of a light-receiving amount as compared with the example of FIG. 27A. In the example of FIG. 27A, manufacturing (positioning) is easier than the example of FIG. 27B.

In an example of FIG. 28, a range A8 for projection is formed in the middle region of the pupil range A0, and has a regular triangle shape. In this case as well, as illustrated in FIG. 29A, the light-shielding range M1 has a circular shape that includes inside a region corresponding to the range A8 (in detail, a region corresponding to a circumcircle of the regular triangle of the range A8). Alternatively, as illustrated in FIG. 29B, the light-shielding range M1 may have a shape that is substantially coincident with the shape of the range A8. In an example of FIG. 29B, it is possible to reduce loss of a light-receiving amount as compared with the example of FIG. 29A. In the example of FIG. 29A, manufacturing (positioning) is easier than the example of FIG. 29B.

Further, the pupil shape of the projection lens section 30 is not limited to the circular shape as described above; other shapes, for example, a polygon such as a square, a rectangle, a hexagon, and a triangle may be adopted, although illustration is not given.

Modification Examples 4-1 to 4-3

FIG. 30 to FIG. 33 each schematically illustrate a configuration of a main part of each of projection display units according to Modification Examples 4-1 to 4-3. In the foregoing embodiments, the description is given of a configuration in which the reflection-type LCOS is used as the light valve 21 and the PBS 23 (optical device) allows for splitting into respective optical paths (three optical paths) of the illumination section 10, the light-receiving section 20, and the light valve 21. However, the "light valve" and the "optical device" of the present disclosure are not limited to those described above, and may have the following configurations.

For example, in Modification Example 4-1 illustrated in FIG. 30, a transmission-type light valve 21A, for example, is used instead of the light valve 21 (reflection-type LCOS) of the foregoing embodiments. In this case, an optical device (an optical device 23A) is configured to allow for splitting into two optical paths, i.e., an optical path (L41) that passes through the illumination section 20A (and the light valve 21A) and an optical path (L42) that passes through the light-receiving section 20.

Further, in Modification Example 4-2 illustrated in FIG. 31, a light valve 21B that includes another reflection-type display device, for example, Digital Light Processing (DLP) (Registered Trademark) is used instead of the light valve 21 (LCOS) of the foregoing embodiments. In this case, two optical devices (optical devices 2361 and 2362) are disposed. A combination of the two optical devices 2361 and 23b2 allows for splitting into respective optical paths (L51, L52, and L53) of the illumination section 10, the light-receiving section 20A, and the light valve 21B.

Further, in Modification Example 4-3 illustrated in FIG. 32, an imager-integrated light valve 21C (reflection-type LCOS) is used instead of the light valve 21 (reflection-type LCOS) of the foregoing embodiments. In this example, the light valve 21C also serves the function of the light-receiving section 20 of the foregoing embodiment. In this case, an optical device (an optical device 23C) is configured to allow for splitting into two optical paths, i.e., an optical path (L61) that passes through the illumination section 10 and an optical path (L62) that passes through the light valve 21C (the light-receiving section 20).

Although the present disclosure has been described above referring to the embodiments and the modification examples thereof, the present disclosure is not limited to the foregoing embodiments, etc., and may be modified in a variety of ways. For example, the number of the pupil division of the projection lens section 30 is set to two (division into two); however, the number of division is not limited to two, but may be three or more. However, increase in the number of division by the pupil division makes a cutoff frequency likely to occur, thus leading to a concern that resolving power may be lowered. Accordingly, it is desirable to adopt the division into two described in the foregoing embodiments, etc.

Further, although the laser light source is used for the illumination section 10 in the foregoing embodiments, etc., this is not limitative; an LED light source may be used. However, it is desirable to use the laser light source. One reason for this is that etendue is able to be set small in emission light (illumination light) of the illumination section 10, thus making it possible to narrow the pupil distribution of the illumination section 10, which therefore allows for assignment to a portion of the pupil range of the projection lens section 30, while suppressing loss of an optical amount.

Moreover, although description has been given in the foregoing embodiments, etc. to the effect that it is possible to detect visible light, a configuration may be adopted to allow for detection of not only visible light but also non-visible light. In this case, for example, a main body 200 of a projection display unit 2 is provided with a near-infrared light source 210 (alternatively, as a separate unit) as illustrated in FIG. 33. The near-infrared light source 210 is configured to irradiate, for example, a region on the projection surface 400 with near-infrared light La for detection in such a manner as to cover the region. Light diffused and reflected (near-infrared scattered light Lb) on a surface of an object 71 such as a finger, of the near-infrared light La for detection irradiated from the near-infrared light source 210, is taken in via the projection lens section 30, thus making it possible to perform imaging based on near-infrared light.

It is to be noted that the effects described herein are illustrative, and may be other effects or may further have other effects.

For example, the present disclosure may have the following configurations.

(1)

A projection display unit including:

an illumination section including one or a plurality of light sources;

a light valve that modulates light emitted from the illumination section and outputs the modulated light;

a projection lens section that projects the light outputted from the light valve onto a projection surface; and a light-receiving section including an imaging device that receives light incident via the projection lens section, a first range corresponding to a portion of a pupil range of the projection lens section being assigned for projection, and the light-receiving section including a light-shielding part that performs light-shielding of a selective part corresponding to the first range, at a position substantially optically conjugate with respect to an aperture of the projection lens section.

(2)

The projection display unit according to (1), in which a light-shielding range light-shielded by the light-shielding part is substantially coincident with the part corresponding to the first range, at a position, in the light-receiving section, optically conjugate with respect to the aperture of the projection lens section.

(3)

The projection display unit according to (1) or (2), in which a following conditional expression (A) is satisfied:

$$0.2 \leq SOBJ/SALL \leq 0.8 \quad (A)$$

where SALL denotes total area of a pupil range of the light-receiving section, and SOBJ denotes area of a light-shielding range light-shielded by the light-shielding part.

(4)

The projection display unit according to any one of (1) to (3), in which a pupil range of the light-receiving section is divided into the first range and a second range for imaging.

(5)

The projection display unit according to (4), in which the first range is assigned to a middle region including an optical axis, and the second range is assigned to a circumferential region of the first range.

(6)

The projection display unit according to (4), in which the second range is assigned to a middle region including an optical axis, and the first range is assigned to a circumferential region of the second range.

(7)

The projection display unit according to (4), in which the first range is assigned to a region displaced to one side of the pupil range of the projection lens section.

(8)

The projection display unit according to (5), in which the illumination section has an F-number of 2 or more.

(9)

The projection display unit according to any one of (1) to (8), in which a following conditional expression (B) is satisfied:

$$FOBJ \times 0.9 \leq FOPE \qquad (B)$$

where FOPE denotes an F-number of an opening of the light-receiving section, and FOBJ denotes an F-number of a light-shielding range light-shielded by the light-shielding part.

(10)

The projection display unit according to any one of (1) to (9), in which the illumination section includes a semiconductor laser as the light source.

(11)

The projection display unit according to any one of (1) to (10), including one or a plurality of optical devices each configured to allow for splitting into an optical path that passes through the illumination section and an optical path that passes through the light-receiving section.

(12)

The projection display unit according to (11), in which the optical device is a polarizing beam splitter.

(13)

The projection display unit according to any one of (1) to (12), in which the light valve is a reflection-type display device.

(14)

The projection display unit according to any one of (1) to (13), in which a light-shielding range light-shielded by the light-shielding part and the part corresponding to the first range each have a circular shape or a polygonal shape.

(15)

The projection display unit according to (14), in which the light-shielding range light-shielded by the light-shielding part has a shape that is circumscribed about a shape of the part corresponding to the first range, at the position, in the light-receiving section, optically conjugate with respect to the aperture of the projection lens section.

(16)

The projection display unit according to any one of (1) to (15), in which
the light-receiving section includes an aperture at the optically conjugate position with respect to the aperture of the projection lens section, and
the light-shielding part is disposed to cover a selective part of an opening of the aperture of the light-receiving section.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display unit, comprising:
an illumination section including one or a plurality of light sources;
a light valve that modulates light emitted from the illumination section and outputs the modulated light;
a projection lens section that projects the light outputted from the light valve onto a projection surface; and
a light-receiving section including an imaging device that receives the light incident via the projection lens section, wherein a first range corresponding to a portion of a pupil range of the projection lens section being assigned for the projection, and
the light-receiving section including a light-shielding part that performs light-shielding of a selective part corresponding to the first range, at a position substantially optically conjugate with respect to an aperture of the projection lens section.

2. The projection display unit according to claim 1, wherein a light-shielding range light-shielded by the light-shielding part is substantially coincident with the selective part corresponding to the first range, at a position, in the light-receiving section, optically conjugate with respect to the aperture of the projection lens section.

3. The projection display unit according to claim 1, wherein a following conditional expression (1) is satisfied:

$$0.2 \leq SOBJ/SALL \leq 0.8 \qquad (1)$$

where SALL denotes a total area of a pupil range of the light-receiving section, and SOBJ denotes an area of a light-shielding range light-shielded by the light-shielding part.

4. The projection display unit according to claim 1, wherein a pupil range of the light-receiving section is divided into the first range and a second range for imaging.

5. The projection display unit according to claim 4, wherein
the first range is assigned to a middle region including an optical axis, and
the second range is assigned to a circumferential region of the first range.

6. The projection display unit according to claim 4, wherein
the second range is assigned to a middle region including an optical axis, and
the first range is assigned to a circumferential region of the second range.

7. The projection display unit according to claim 4, wherein the first range is assigned to a region displaced to one side of the pupil range of the projection lens section.

8. The projection display unit according to claim 5, wherein the illumination section has an F-number of 2 or more.

9. The projection display unit according to claim 1, wherein a following conditional expression (2) is satisfied:

$$FOBJ \times 0.9 \leq FOPE \qquad (2)$$

where FOPE denotes an F-number of an opening of the light-receiving section, and FOBJ denotes an F-number of a light-shielding range light-shielded by the light-shielding part.

10. The projection display unit according to claim 1, wherein the illumination section includes a semiconductor laser as a light source of the plurality of light sources.

11. The projection display unit according to claim 1, comprising one or a plurality of optical devices each configured to allow for splitting into an optical path that passes through the illumination section and an optical path that passes through the light-receiving section.

12. The projection display unit according to claim 11, wherein an optical device of the plurality of optical devices comprises a polarizing beam splitter.

13. The projection display unit according to claim 1, wherein the light valve comprises a reflection-type display device.

14. The projection display unit according to claim 1, wherein a light-shielding range light-shielded by the light-shielding part and the selective part corresponding to the first range each have a circular shape or a polygonal shape.

15. The projection display unit according to claim 14, wherein the light-shielding range light-shielded by the light-shielding part has a shape that is circumscribed about a shape of the selective part corresponding to the first range, at a position, in the light-receiving section, optically conjugate with respect to the aperture of the projection lens section.

16. The projection display unit according to claim 1, wherein
the light-receiving section includes an aperture at an optically conjugate position with respect to the aperture of the projection lens section, and
the light-shielding part is disposed to cover a selective part of an opening of the aperture of the light-receiving section.

17. The projection display unit according to claim 1, wherein
the light-receiving section includes a lens for each of pixels of the imaging device on a light-receiving side of the imaging device,
the imaging device is disposed at the position substantially optically conjugate with respect to the aperture of the projection lens section, and
the light-shielding part is disposed for each of the pixels between the imaging device and the lens.

18. The projection display unit according to claim 6, wherein the illumination section includes an axicon lens.

19. The projection display unit according to claim 18, wherein the light-shielding part comprises an aperture.

20. The projection display unit according to claim 7, wherein the illumination section includes a lens array in which each individual lens has a flattened hexagonal surface shape.

* * * * *